US011068473B1

(12) United States Patent
Wyner et al.

(10) Patent No.: US 11,068,473 B1
(45) Date of Patent: Jul. 20, 2021

(54) SCALABLE AND ADVANCED ANALYTICS COMPUTING PLATFORM FOR DISTRIBUTED LEDGER DATA

(71) Applicant: KPMG LLP, New York, NY (US)

(72) Inventors: Samuel Wyner, Albertson, NY (US); Salvatore Joseph Ternullo, Medford, MA (US); Shekar Atmakur, Atlanta, GA (US); Derek Becker, Chicago, IL (US); Kevin Bornatsch, Jersey City, NJ (US); Okikiola Famutimi, Boston, MA (US)

(73) Assignee: KPMG LLP, New York, NY (US)

( * ) Notice: Subject to any disclaimer, the term of this patent is extended or adjusted under 35 U.S.C. 154(b) by 0 days.

(21) Appl. No.: 17/196,334

(22) Filed: Mar. 9, 2021

Related U.S. Application Data

(60) Provisional application No. 63/019,135, filed on May 1, 2020.

(51) Int. Cl.
| H04L 9/06 | (2006.01) |
| H04L 29/06 | (2006.01) |
| H04L 9/32 | (2006.01) |
| G06F 16/23 | (2019.01) |
| G06F 16/27 | (2019.01) |
| G06F 21/60 | (2013.01) |
| G06F 9/54 | (2006.01) |
| H04L 9/08 | (2006.01) |

(52) U.S. Cl.
CPC ......... *G06F 16/2379* (2019.01); *G06F 9/547* (2013.01); *G06F 16/27* (2019.01); *G06F 21/602* (2013.01); *H04L 9/0894* (2013.01)

(58) Field of Classification Search
CPC ............ H04L 2209/38; H04L 2209/56; H04L 9/0894; H04L 9/3239; H04L 9/0637; G06Q 2220/00; G06F 9/547; G06F 21/502; G06F 16/2379; G06F 16/27
See application file for complete search history.

(56) References Cited

U.S. PATENT DOCUMENTS

| 10,192,073 | B2 | 1/2019 | Marin |
| 10,915,641 | B2 | 2/2021 | Smith et al. |
| 2015/0363777 | A1 | 12/2015 | Ronca et al. |
| 2018/0165758 | A1 | 6/2018 | Saxena et al. |
| 2019/0236598 | A1 | 8/2019 | Padmanabhan |
| 2020/0043007 | A1 | 2/2020 | Simons |
| 2020/0145189 | A1* | 5/2020 | Androulaki ............... G06F 9/54 |

FOREIGN PATENT DOCUMENTS

WO 2019237126 A1 12/2019

OTHER PUBLICATIONS

Lu et al., Design Pattern as a Service for Blockchain Applications, 8 pages (Year: 2018).*

(Continued)

*Primary Examiner* — Thuy Dao
(74) *Attorney, Agent, or Firm* — Hunton Andrews Kurth LLP

(57) ABSTRACT

Systems and methods disclosed herein are directed to a scalable and advanced analytics computing platform for distributed ledger data for integrating an entity's legacy systems, distributed ledger systems, and crypto-asset transactions, as well as related metadata.

20 Claims, 23 Drawing Sheets

(56) References Cited

OTHER PUBLICATIONS

"Bitcoin Mining Explained Like You're Five: Part 2—Mechanics", Escape Velocity, Visions of a Freer Future, https://chrispacia.wordpress.com/2013/09/02/bitcoin-mining-explained-like-youre-five-part-2-mechanics/, 2013, pp. 1-22.

Wang et al., Measurement and Analysis of the Bitcoin Networks: A View From Mining Pools, Feb. 21, 2019, pp. 1-13.

Moser et al., "Towards Risk Scoring of Bitcoin Transactions", Department of Information Systems, University of Munster, Munster, Germany, 2014, pp. 16-32.

International Searching Authority, International Search Report and Written Opinion, International Application No. PCT/US21/21506, dated May 20, 2021, pp. 1-15.

\* cited by examiner

Address Balance Validation

Use Case Description 403: External auditors are able to leverage the immutability and transparency enabled by public blockchains in order to independently validate the existence and control of customer accounts. FIs can simply provide the list of their addresses to their auditor. The auditor can then look up the balance of each address using an easily accessible blockchain explorer.

Run Description 404: Test Run for acceptance testing

Type of Validation 405: Reconciliation ▽

Sub-ledger Upload: 406 C:\Users\CF\SubLedger\Sub-ledger-2019-12-31.csv of Addresses 407: ● Single  ○ Multiple  ○ File Upload

Address 408: 1A1zP1eP5QGefi2DMPTfTL5SLmv7DivfNa    BTC ▽ of Dates 409: ○ Single  ○ Multiple  ● Range

Dates 410: 12/01/2019  📅   12/31/2019  📅

[ Run ]

Figure 4A

Address Balance Validation

| Reconciled 411 | | Breaks 412 | | | | | | | |
|---|---|---|---|---|---|---|---|---|---|
| Address 413 | Currency 414 | Date 415 | Balance (native) SL 416 | Balance (USD) SL 417 | 418 Balance (native) blockchain | 419 Balance (USD) blockchain | First Transaction 420 | Last Transaction 421 | # of Transactions 422 |
| 1A1zP1ePSQGefi2DMPTf TL5SLmv7DivfNa | BTC | 12/01/2019 | 12 BTC | $12,000.00 | 12 BTC | $12,000.00 | 0000000000000000 000000002f5e7... | 0000000000000000 0000000047f926... | 35 |
| 1A1zP1ePQGefi2DMPTfTL 5SLmv7DivfN | BTC | 12/02/2019 | 11.456 BTC | $11,340.00 | 11.456 BTC | $11,340.00 | 0000000000000000 000000002f5e7... | 0000000000000000 0000000047f926... | 35 |
| 1A1zP1ePQGefi2DMPTfTL 5SLmv7DivfN | BTC | 12/03/2019 | | | | | | | |
| 1A1zP1ePQGefi2DMPTfTL 5SLmv7DivfN | BTC | 12/04/2019 | | | | | | | |
| 1A1zP1ePQGefi2DMPTfTL 5SLmv7DivfN | BTC | 12/05/2019 | | | | | | | |
| 1A1zP1ePQGefi2DMPTfTL 5SLmv7DivfN | BTC | 12/06/2019 | | | | | | | |
| 1A1zP1ePQGefi2DMPTfTL 5SLmv7DivfN | BTC | 12/07/2019 | | | | | | | |
| ... | ... | ... | ... | ... | ... | ... | ... | ... | ... |
| 1A1zP1ePSQGefi2DMPTf TL5SLmv7DivfNa | BTC | 12/31/2019 | 31 BTC | $23,487.95 | 31 BTC | $23,487.95 | 0000000000000000 000000002f5e7... | 0000000000000000 0000000047f926... | 35 |

Export

Figure 4B

Address Balance Validation

| Reconciled 411 | | | | Breaks 412 | | | | | | | |
|---|---|---|---|---|---|---|---|---|---|---|---|
| Address 413 | Currency 414 | Date 415 | Balance (native) SL 416 | Balance (USD) SL 417 | 418Balance (native) blockchain | 419Balance (USD) blockchain | Difference (native) 430 | Difference (USD) 431 | 420 First Transaction (blockchain) | 421 Last Transaction (blockchain) | # of Transactions 422 |
| 1A1zP1eP5... | BTC | 12/01/2019 | 12 BTC | $12,000.00 | 11.5 BTC | $11,500.00 | .5 BTC | $500.00 | 000000... | 000000... | 35 |
| 1A1zP1eP5... | BTC | 12/02/2019 | | | | | | | | | 35 |
| 1A1zP1eP5... | BTC | 12/03/2019 | | | | | | | | | |
| 1A1zP1eP5... | BTC | 12/10/2019 | | | | | | | | | |
| 1A1zP1eP5... | BTC | 12/11/2019 | | | | | | | | | |
| ... | ... | ... | ... | ... | | | | | | | |
| 1A1zP1eP5... | BTC | 12/31/2019 | 31 BTC | $23,487.95 | 31 BTC | $23,487.95 | 0 | 0 | 00000... | 00000... | 35 |

Export

Figure 4C

Address Balance Validation

Address Balances

| Address 440 | Currency 441 | Date 442 | Balance (native) 443 | Balance (USD) 444 | First Transaction 445 | Last Transaction 446 | # of Transactions 447 |
|---|---|---|---|---|---|---|---|
| 1A1zP1eP5QGefi2DMPTfTL5SLmv7DivfNa | BTC | 12/01/2019 | 12 BTC | $12,000.00 | 000000000000000000002f5e7... | 000000000000000000047f926... | 35 |
| 1A1zP1eP5QGefi2DMPTfTL5SLmv7DivfNa | BTC | 12/02/2019 | 11.456 BTC | $11,340.00 | 000000000000000000002f5e7... | 000000000000000000047f926... | 35 |
| 1A1zP1eP5QGefi2DMPTfTL5SLmv7DivfNa | BTC | 12/03/2019 | | | | | |
| 1A1zP1eP5QGefi2DMPTfTL5SLmv7DivfNa | BTC | 12/04/2019 | | | | | |
| 1A1zP1eP5QGefi2DMPTfTL5SLmv7DivfNa | BTC | 12/05/2019 | | | | | |
| 1A1zP1eP5QGefi2DMPTfTL5SLmv7DivfNa | BTC | 12/06/2019 | | | | | |
| 1A1zP1eP5QGefi2DMPTfTL5SLmv7DivfNa | BTC | 12/07/2019 | | | | | |
| ... | ... | ... | ... | ... | ... | ... | ... |
| 1A1zP1eP5QGefi2DMPTfTL5SLmv7DivfNa | BTC | 12/31/2019 | 31 BTC | $23,487.95 | 000000000000000000002f5e7... | 000000000000000000047f926... | 35 |

Export

Figure 4E

Fractional Reserve Detection

| Addresses Reconciled 460 | | Amount Mismatches 461 | | | Address Mismatches 462 | | Customer Act Reconciled 463 | | Customer Act Breaks 464 | |
|---|---|---|---|---|---|---|---|---|---|---|
| Address 470 | Currency 471 | Date 472 | Balance (native) SL Address 473 | Balance (USD) SL Address 474 | 475 Balance (native) Blockchain Address | 476 Balance (USD) blockchain Address | First Transaction 477 | Last Transaction 478 | # of Transactions 479 |
| 1A1zP1eP5QGefi2DMPTf TL5SLmv7DivfNa | BTC | 11/01/2019 | 12 BTC | $12,000.00 | 12 BTC | $12,000.00 | 000000000000000 0000000002f5e7... | 000000000000000 00000000047f926... | 3 |
| 0x24cc76CD862482DA76 cb127daDBfdc7f0fa21563 | ETH | 11/01/2019 | 100 ETH | $19,540.34 | 100 ETH | $19,540.34 | 0xdb53cc190a2a 442fd8a9347ad... | 0x74f5dfaeb64c6 62955b17827... | 5 |

Export

Figure 4G

Fractional Reserve Detection

| Reconciled | | | Amount Mismatches 461 | | | | Address Mismatches | | Customer Act Reconciled | Customer Act Breaks | | |
|---|---|---|---|---|---|---|---|---|---|---|---|---|
| Address 470 | Currency 471 | Date 472 | Balance (native) SL Address 473 | Balance (USD) SL Address 474 | Balance (native) blockchain Address 475 | Balance (USD) blockchain Address 476 | Difference (native) 480 | Difference (USD) 481 | First Transaction 477 | Last Transaction 478 | # of Transactions 479 |
| 1A1zP1eP5QG efi2DMPTfTL5 SLmv7DivfNa | BTC | 11/01/2019 | 12 BTC | $12,000.00 | 11 BTC | $11,000.00 | 1 BTC | $1,000.00 | 0000000000 000000002f 5e7ee5d... | 0000000000 0000000000 047f926... | 3 |
| 0x6a76c822e b2a7d21D81Bb 8b4943512db2 b17C266 | ETH | 11/01/2019 | 50 ETH | $9,770.17 | 25 ETH | $4,885.09 | 25 ETH | $4,885.09 | 0xdb53cc19 0a2a442fd8 a347ad... | 0x74f5dfaeb 64c662955b 17827... | 5 |

Export

Figure 4H

| Fractional Reserve Detection |||||||||
| --- | --- | --- | --- | --- | --- | --- | --- | --- |
| Reconciled | | Amount Mismatches ||| Address Mismatches 462 || Customer Act Reconciled | Customer Act Breaks ||
| Address 470 | Currency 471 | Date 472 | Balance (native) SL Address 473 | Balance (USD) SL Address 474 | 475Balance (native) blockchain Address | 476Balance (USD) blockchain Address | First Transaction 477 | Last Transaction 478 | # of Transactions 479 |
| 1A1zP1eP5QGefi2DMPTf TL5SLmv7DivfNa | BTC | 11/01/2019 | | | 11 BTC | $11,000.00 | 000000000000000 0000000002f5e7... | 000000000000000 0000000047f926... | 3 |
| 0x24cc76CD862482DA76c b127daDBfdc7f0fa21563 | ETH | 11/01/2019 | 100 ETH | $19,540.34 | | | 0xdb53cc190a2a4 42fd8a9347... | 0x74f5dfaeb64c6 62955b17827... | 5 |
| 0x6a76c822eb2a7d21D81 Bb8b4943512db2b17C266 | ETH | 11/01/2019 | | | | | | | |

Export

Figure 4I

Fractional Reserve Detection

| Reconciled | | Amount Mismatches | | Address Mismatches | Customer Act Reconciled 463 | | Customer Act Breaks | |
|---|---|---|---|---|---|---|---|---|
| Address Type 482 | Total held for Customers (native) 483 | | Total held for Customers (USD) 484 | Balance in Subledger address (native) 485 | Balance in Subledger address (USD) 486 | Balance on chain (native) 487 | | Balance on chain (USD) 488 |
| BTC | 1000 BTC | | $9,950,000.00 | 1000 BTC | $9,950,000.00 | 1000 BTC | | $10,000,000.00 |
| ETH | 1000 ETH | | $136,950.00 | 1000 ETH | $136,950.00 | 1000 ETH | | $137,000.00 |

Export

Figure 4J

Fractional Reserve Detection

| Reconciled | | Amount Mismatches | Address Mismatches | | Customer Act Reconciled | | Customer Act Breaks 464 | | |
|---|---|---|---|---|---|---|---|---|---|
| Address Type 482 | Total held for Customers (native) 483 | Total held for Customers (USD) 484 | Balance in Subledger address (native) 485 | Balance in Subledger address (USD) 486 | Balance on chain (native) 487 | Balance on chain (USD) 488 | Difference to Subledger (native) 489 | Difference to Subledger (USD) 490 | Difference to on chain assets (native) 491 | Difference to on chain assets (USD) 492 |
| BTC | 1000 BTC | $9,950,000.00 | 900 BTC | $9,000,000.00 | 900 BTC | $9,000,000.00 | 100 BTC | $950,000.00 | 100 BTC | $950,000.00 |
| ETH | 1000 ETH | $136,950.00 | 1000 ETH | $136,950.00 | 1200 ETH | $164,400.00 | 0 ETH | $0 | 200 ETH | $27,450.00 |

Export

Figure 4K

SCALABLE AND ADVANCED ANALYTICS COMPUTING PLATFORM FOR DISTRIBUTED LEDGER DATA

CROSS REFERENCE TO RELATED APPLICATIONS

This Patent application claims priority to U.S. Application No. 63/019,135, filed May 1, 2020, the complete disclosure of which is incorporated herein by reference.

FIELD OF THE INVENTION

The present invention relates to a scalable and advanced analytics computing platform used for integrating an entity's legacy systems, distributed ledger systems, and crypto-asset transactions, as well as related metadata.

BACKGROUND

Distributed ledger systems such as blockchains maintain immutable ledgers of all transactions that have occurred. Although distributed ledger systems can be designed differently, they still consist of similar core components including a distributed ledger, a consensus mechanism, applied cryptography, and smart contracts/decentralized applications. Further, distributed ledger systems can be categorized into permission-less networks or permissioned networks, with a recognition of increasing interoperability across these types of systems.

Transactions processed on a distributed ledger system reflect a flow of assets or data from one address to another. Each transaction is recorded as a unique event on a distributed ledger in a block of transactions, where each block is cryptographically linked to a prior block, creating an immutable history of transactions. In this regard, the ledger shows every transaction that has been processed on the network, consistently reflecting the current position of all addresses and participants. Transactions executed on distributed ledger systems are validated through consensus mechanisms, which can also vary by implementation. Consensus mechanisms deployed in permission-less blockchains, most notably through proof of work (PoW), enable coordinated participation of unknown participants by enforcing economic incentives within the protocol to maintain the integrity of the system.

For example, in the PoW consensus mechanism, transactions are confirmed by validator nodes, often called "miners," who dedicate computational cycles to produce "nonces" to solve algorithmic puzzles to earn economic incentives in the form of "block rewards." Block rewards are earned by the validator node who solves the puzzle and publishes the next block of valid transactions to the ledger, including their solution. Network participants can then verify the block using the solution provided by the winning validator, and confirm the accuracy of transactions reflected in the block against their own legers. In such a system, if a single entity (or group of colluding entities) controls a majority of the consensus resources (51% of computational capacity "hashpower" for PoW, and varying percentages or thresholds for other consensus mechanisms), that entity could then maliciously manipulate the ledger in a "double spend attack" or "blockchain re-organization." In the PoW context, the security model of the network is directly related to the amount of hashpower and the distribution of hashpower across validator nodes. This principle applies to other consensus-based validation mechanisms as well, e.g., Proof of Stake (PoS).

Further, transactions executed on distributed ledger systems are cryptographically recorded, which creates technical challenges to decrypt blocks of transactional data into structures that can be analyzed in meaningful ways. In addition, transactions recorded on distributed ledgers are executed using use digital signatures, including only a pseudonymous public key identifier on the ledger. The relationship between a public key (in a public key infrastructure (PKI) as used by distributed ledger technologies) and the identity of the entity using the key is not shared on permission-less blockchains, creating complexity to track and understand the relationship between transactions on the ledger and an individual entity. Finally, transactions are currency-agnostic without any established native fiat currency (e.g., U.S. dollars) pricing mechanism.

In these regards, the aggregation and analysis of on-chain data by a single system (that is, data residing on a distributed ledger) to provide valuable insights has proven to be non-trivial.

While transactional activity on permissioned and permission-less blockchains is being analyzed extensively across the market, the performance and security of consensus mechanisms has not been a focus of practical or in-production commercial applications such as proprietary trading. In this regard, there is a considerable lack of meaningful insights into the concentration of power to validate transactions through hashpower, presenting potential risks to network participants. For example, colluding nodes (by one or more entities), controlling 51%+ of the hashpower on the Bitcoin network, could execute fraudulent transactions or potentially alter past transactions.

The integration of business applications and assets hosted on distributed ledger systems present further challenges when used practically in conjunction with client-server legacy systems (i.e., non-distributed ledger systems), such as: (i) multiple systems are required to accomplish the same end goals, e.g., multiple anti-money laundering (AML) transaction monitoring systems that convey the same rules across disparate systems increasing operational and technical overhead, (ii) data quality issues make advanced analytics difficult or impossible, (iii) scale of transaction data and metadata can strain legacy systems, (iv) data privacy in addition to creating challenges in meeting, and/or (v) financial reporting and account requirements It would be desirable, therefore, to have systems and methods to aggregate and analyze complete, aggregate information across different data stores, including but not limited to, permission-less and permissioned distributed ledger systems alongside traditional client-server systems (e.g. enterprise resources planning systems, accounting systems, anti-money laundering systems, fraud detection systems, risk management systems) to overcome the deficiencies of known systems.

SUMMARY

According to an embodiment, the invention relates to a scalable and advanced analytics computing platform for distributed ledger data for integrating an entity's client server (i.e., non-distributed ledger systems), distributed ledger systems, and crypto-asset transactions as well as related metadata. Exemplary embodiments of the platform can provide for a plurality of modules, with each module including analytics capabilities, as well as business logic and data aggregation capabilities, to analyze data from different distributed ledger (e.g., blockchains) and non-distributed ledger systems (e.g., enterprise resource planning (ERP) system). As such, the platform can provide novel insights into interactions between the different distributed ledger and the non-distributed ledger systems. Further, exemplary embodiments of the invention can also provide for novel user interfaces/user experiences.

According to an embodiment, the platform can provide benefits for a number of different use cases, e.g., blockchain public address balance validation, fractional reserve detection, digital asset custody (e.g., wallet) using multiparty computation (MPC) wallets and related processing for transaction creation, signing and transmissions.

For example, with regard to address balance validation, the platform can provide users with a process for comparing internal ledger balances with balances of addresses on a given public blockchain at the direction of the user. Further, a user can provide a listing of blockchain public addresses and a copy of an internal ledger, and, for a given date as defined by the user, the platform can calculate: (i) a total balance of blockchain assets per internal ledger, (ii) a total balance of blockchain assets per address, and/or (iii) a fiat currency (e.g., U.S. dollar, etc.) value of assets based on industry reference rates (obtained via external data provider) for a given date. The platform can then output a comparison of blockchain asset balances with internal ledger balances to validate the user's assets.

Further, with regard to fractional reserve detection, the platform can provide information that the total balance of an institution's blockchain assets as indicated on the blockchain's ledger matches the total customer balance as indicated in an ERP, internal ledger, or other legacy system. In particular, a user can provide a copy of an internal ledger including a listing of customer account balances and a listing of controlled blockchain addresses, and, for a given set of dates, the platform can calculate: (i) a total balance of blockchain assets per asset type based on internal ledger, (ii) a total balance of blockchain assets per asset type based on customer account records, (iii) a total balance of blockchain assets per asset type based on owned blockchain addresses, and/or (iv) a fiat currency (e.g., U.S. dollar, etc.) value of blockchain assets based on a daily reference rate. The platform can then output a comparison of the customer accounts in the internal ledger and owned blockchain addresses to validate that the customer account balances match the actual number of an entity's owned blockchain assets. Further, with regard to customer account validation, the platform can validate customer account accuracy by reconciling the balance of blockchain addresses against customer account balances via an internal ledger. In particular, a user can provide customer account records and a listing of blockchain addresses to the platform and it can then (i) trace transaction originating from owned blockchain addresses, (ii) compare transaction retrace data to customer account records, and/or (iii) confirm that the customer account balances are accurate. The platform can then output the results of the reconciliation indicating where balances did or did not match.

Further, with regard to digital asset custody (e.g., wallets), the platform can provide a single gateway to access different underlying crypto-asset custody technologies. The platform leverages MPC cryptography to perform signing across software and hardware which is dispersed across organizations and geographies. Further, according to an embodiment, the MPC wallet can be substituted by any other cryptographic or digital signature scheme or protocol used to securely custody crypto-assets with multiple signatures or quorum participants. Crypto-asset transaction signing using MPC enhances security and resiliency by eliminating single points of failure and enhancing extensibility across blockchain protocols and digital asset tokens. The MPC solution implemented within the embodiment may be designed in dynamic quorums which allow for risk-based policies, on-boarding/off-boarding of new key share participants, and asynchronous signing capabilities allowing for implementation within geographically dispersed and secured air-gapped hardware security modules (HSMs). The execution of transactions using MPC software generates reference data around the transaction signing process which can be captured and aggregated as factors for analytics on transaction processing and operational control.

Further, the platform can also provide users with accurate time stamps of when a transaction was signed through an MPC process and across the confirmation/consensus process on a given blockchain. As such, for transactions signed through the platform, a variety of transaction metrics can be provided. For example, the platform can provide the time stamps and metadata around key events including transaction signing, risk and compliance validations, as well as when a transaction is confirmed by other validators on the blockchain. The platform can then output granular transaction data and transaction metrics, such as time between transaction signing and blockchain validation.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4A depicts a user interface that can be utilized for reconciliation during the user interaction in FIG. 3A according to an exemplary embodiment of the invention.

FIG. 4B depicts a first output of the reconciliation during the user interaction in FIG. 3A according to an exemplary embodiment of the invention.

FIG. 4C depicts a second output of the reconciliation during the user interaction in FIG. 3A according to an exemplary embodiment of the invention.

FIG. 4E depicts an output of the address balance calculation during the user interaction in FIG. 3A according to an exemplary embodiment of the invention.

FIG. 4G depicts a first output of the fractional reserve detection during the user interaction in FIG. 3B according to an exemplary embodiment of the invention.

FIG. 4H depicts a second output of the fractional reserve detection during the user interaction in FIG. 3B according to an exemplary embodiment of the invention.

FIG. 4I depicts a third output of the fractional reserve detection during the user interaction in FIG. 3B according to an exemplary embodiment of the invention.

FIG. 4J depicts a fourth output of the fractional reserve detection during the user interaction in FIG. 3B according to an exemplary embodiment of the invention.

FIG. 4K depicts a fifth output of the fractional reserve detection during the user interaction in FIG. 3B according to an exemplary embodiment of the invention.

DETAILED DESCRIPTION OF EMBODIMENTS

The following description of embodiments provides non-limiting representative examples to particularly describe features and teachings of different aspects of the invention. The embodiments described should be recognized as capable of implementation separately or in combination with other embodiments of the invention.

Figure 1:
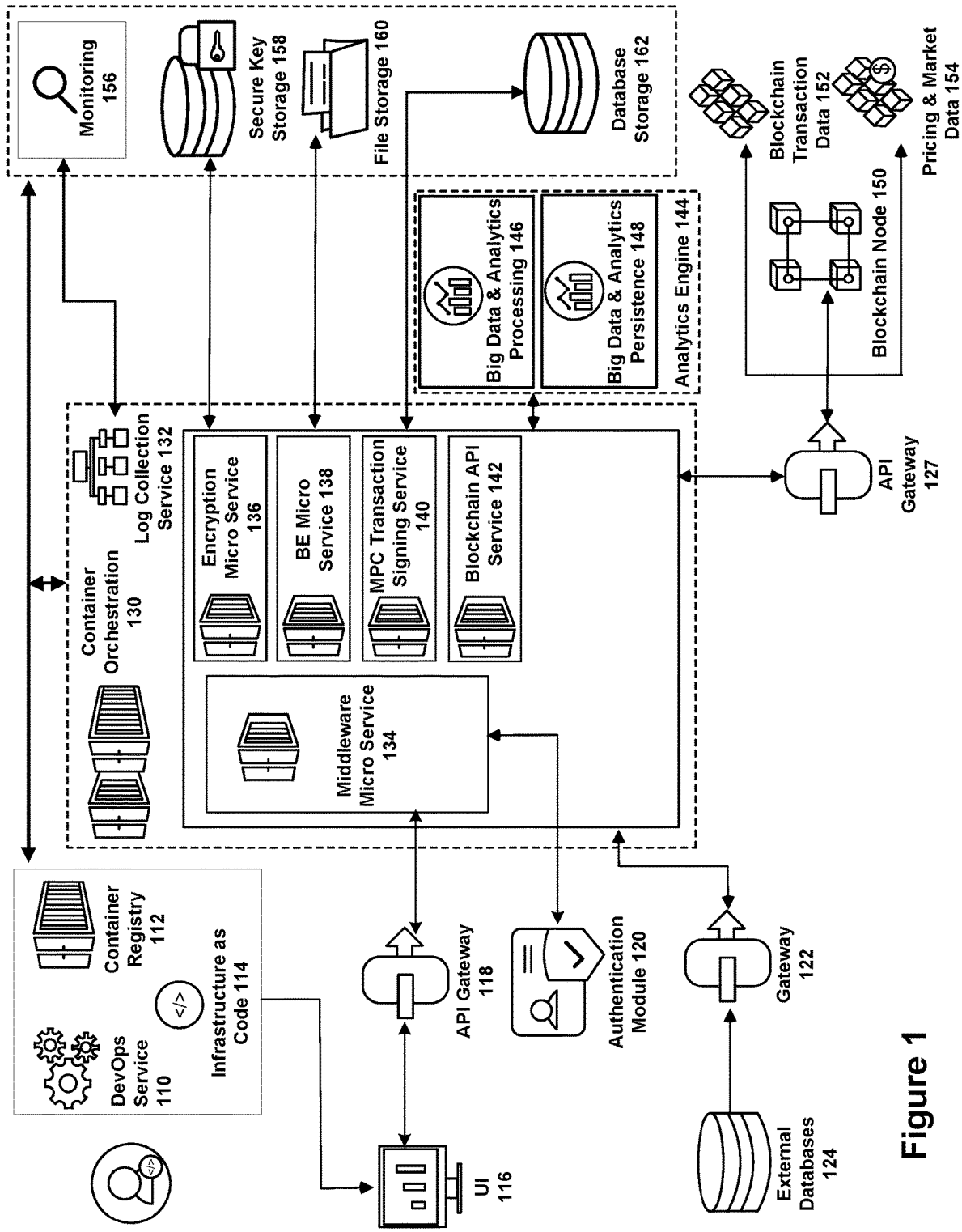
FIG. 1 depicts a system architecture according to an exemplary embodiment of the invention.

FIG. 1 depicts a system architecture according to an exemplary embodiment of the invention. As depicted in the figure, an exemplary system includes a DevOps Service 110 (e.g., set of practices combing software development and information-technology operations), a Container Registry 112, Infrastructure as Code 114 (e.g., management of system infrastructure using a descriptive model), a User Interface (UI) 116, an Authentication Module 120, a API Gateway 118, a plurality of API Gateways 122, 127, External Databases 124, a Container Orchestration 130 ((including a Log Collection Service 132, a Middleware Micro Service 134, Encryption Micro Service 136, Backend (BE) Micro Service 138, MPC Transaction Signing Service 140, Blockchain API Service 142, etc.), an Analysis Engine 144 (including Big Data & Analytics Processing 146 and Big Data & Analytics Persistence 148), a Blockchain Node 150, Blockchain Transaction Data 152 (which represents blockchain data from a data provider), a Pricing & Market Data 154/Reference Rates module, a Monitoring module 156, a Secure Key Storage 158, a File Storage 160, and/or a Database Storage 162.

According to an embodiment, the API gateways represented by 118, 122, 127 can be used to connect to external sources/systems. For example, Container Orchestration 130 may communicate with Blockchain Node 150 via API Gateway 127. In another embodiment, instead of an API gateway, a Web Socket can be used. Further, although the Container Orchestration 130 leverages a micro-services architecture, other types of architecture can also be used, e.g., monolithic approach, etc. In addition, although the figure depicts the blockchain data as a distinct data source, any data source that provides this information from a blockchain or similar distributed ledger solution can also be used. Similarly, although the figure depicts the pricing & market data module as a distinct data source, any data source that provides this information can be used, e.g., the blockchain data module. Further, according to an embodiment, the blockchain node can be a redundant and/or independent copy of the distributed ledger. In this regard, the system can be associated with more than one blockchain node (e.g., multiple for one blockchain), different blockchains (e.g., Bitcoin (BTC), Ethereum (ETH), etc.), as well as host a node as part of the system. Further, according to an embodiment, the external databases can include the general ledger and/or sub-ledger, which are associated with the user's internal books and records. Further, each of the middleware service, Encryption Micro Service 136, the BE Micro Service 138, the MPC Transaction Signing Service 140, and/or the Blockchain API Service 142 can be based on the same programming language, e.g., Python. Further, according to an embodiment, the components that constitute the system and are not part of the UI can be considered the backend of the platform.

Figure 2A:
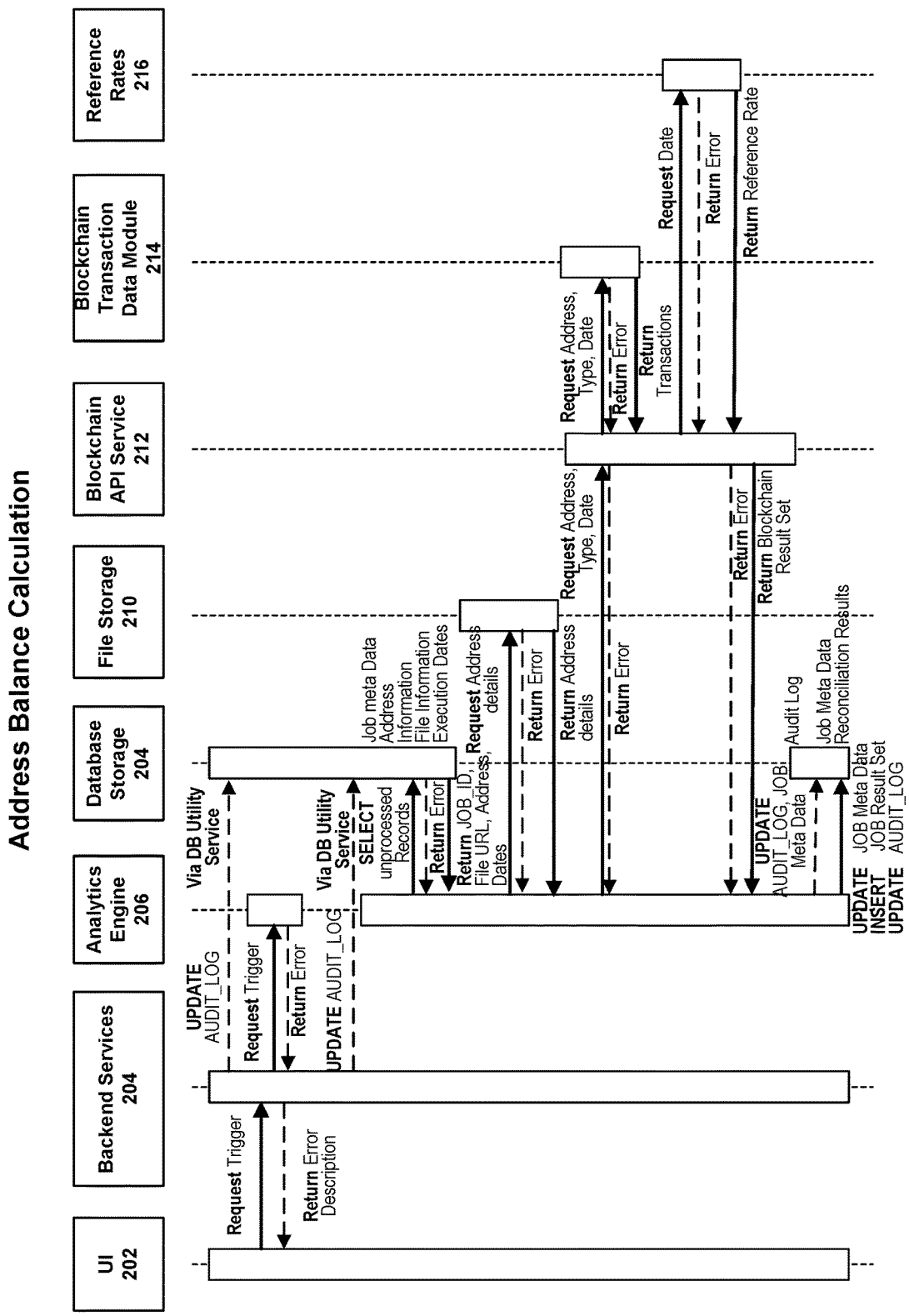
FIG. 2A depicts an address balance calculation flow diagram using the system in FIG. 1 according to an exemplary embodiment of the invention.

FIG. 2A depicts an address balance calculation flow diagram using the system in FIG. 1 according to an exemplary embodiment of the invention. As depicted in the figure, a user can trigger a request to the Analysis Engine 206 from the UI 202 via the platform Backend Services 204. The Analysis Engine 206 selects records from the Database Storage 208 in order to retrieve a job ID (JOB_ID), file URL, address, and/or dates back to the Analysis Engine 206. If a file was uploaded for the addresses, the Analysis Engine 206 requests and retrieves the address details from the File Storage 210 which includes the addresses, as well as the address types. An embodiment of the present invention may support direct integrations with enterprise technologies via messaging technologies as well as modern integrations using APIs. For example, a file may be communicated via gateway to an external database to retrieve the address details. The Analysis Engine 206 can then send the address, type, and/or dates to the Blockchain API Service 212. In response, the Blockchain API Service 212 provides the received information to the Blockchain Transaction Data Module 214, which then returns transactions data to the Blockchain API Service 212. Further, the Blockchain API Service 212 also provides the received type and date information to the Blockchain Transaction Data Module 214 and the pricing & market data module/reference rates module represented by Reference Rates 216, which then return transaction data and reference rate data, respectively, to the Blockchain API Service 212. Based on the received transaction and reference rate data, the Blockchain API Service 212 provides a blockchain result set to the Analysis Engine 206, which can then update the job metadata as well as insert the job result set in the database storage. According to an exemplary embodiment, the blockchain result set can include the transactional information for the addresses provided by the user as well as the reference rates for the type of blockchains for which addresses were provided and dates selected. In addition to depicting successful flow interactions (e.g., solid arrow), the figure also depicts unsuccessful flow/error interactions (e.g., dashed arrow). As such, if for some reason a request fails, an error may be returned.

Figure 2B:
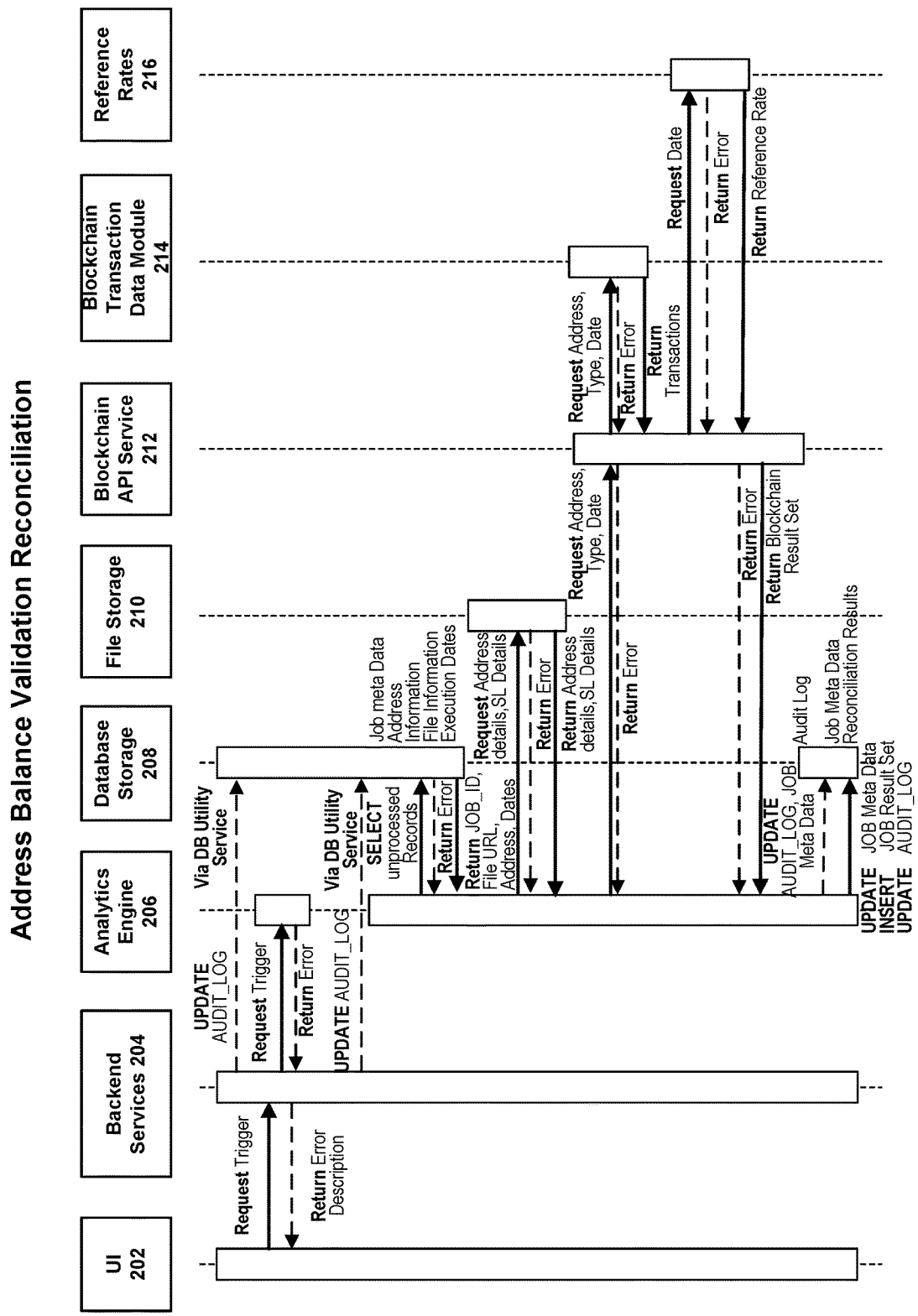
FIG. 2B depicts an address balance validation reconciliation flow diagram using the system in FIG. 1 according to an exemplary embodiment of the invention.

FIG. 2B depicts an address balance validation reconciliation flow diagram using the system in FIG. 1 according to an exemplary embodiment of the invention. As depicted in the figure, a user can trigger a request to the Analysis Engine 206 from the UI 202 via the Backend Services 204. The Analysis Engine 206 selects records from the Database Storage 208 in order to retrieve the job ID (JOB_ID), file URL, address, and/or dates back to the Analysis Engine 206. If a file was uploaded for the addresses, the Analysis Engine 206 requests and retrieves the address details and the sub-ledger (SL) details from the File Storage 210 which includes the addresses, as well as the address types. The analysis engine can then send the address, type, and/or date to the Blockchain API Service 212. In response, the Blockchain API Service 212 provides the received information to the Blockchain Transaction Data Module 214, which then returns transactions data to the Blockchain API Service 212. Further, the Blockchain API Service 212 also provides the received type and date information to the Blockchain Transaction Data Module 214 and the pricing & market data module/reference rates module represented by Reference Rates 216, which then return transaction data and reference rate data, respectively, to the Blockchain API Service 212. Based on the received transaction and reference rate data, the Blockchain API Service 212 provides a blockchain result set to the platform backend, which can then update the job metadata as well as insert the job result set in the Database Storage 208. In addition to depicting successful flow interactions (e.g., solid arrow), the figure also depicts unsuccessful flow/error interactions (e.g., dashed arrow). As such, if for some reason a request fails, an error may be returned.

Figure 2C:
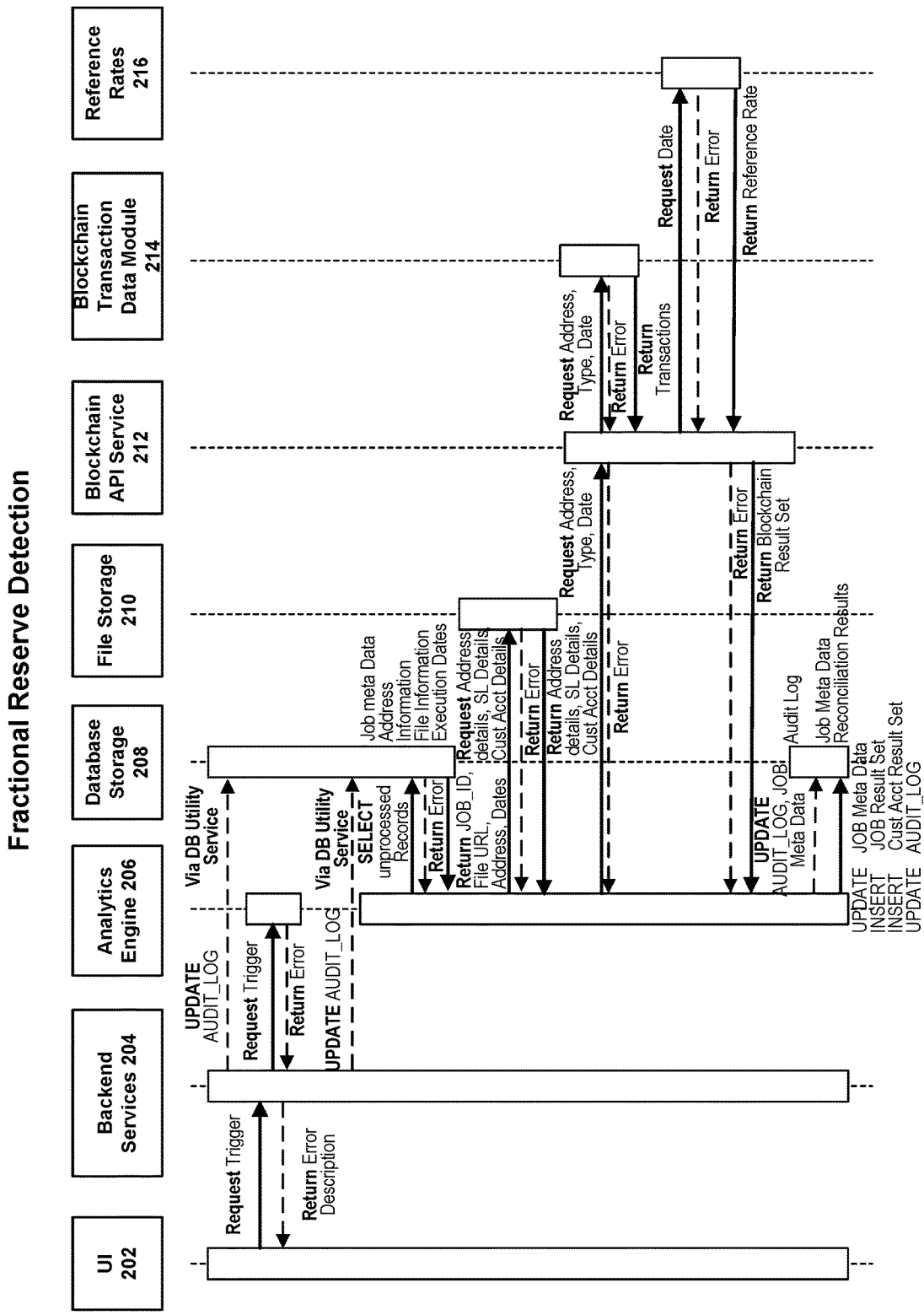
FIG. 2C depicts a fractional reserve detection flow diagram using the system in FIG. 1 according to an exemplary embodiment of the invention.

FIG. 2C depicts a fractional reserve detection flow diagram using the system in FIG. 1 according to an exemplary embodiment of the invention. As depicted in the figure, a user can trigger a request to the Analysis Engine 206 from the UI 202 via the Backend Services 204. The Analysis Engine 206 selects records from the Database Storage 208 in order to retrieve the job ID (JOB_ID), file URL, address, and/or dates back to the Analysis Engine 206. If a file was uploaded for the addresses, the Analysis Engine 206 requests and retrieves the address details, the SL details, and/or the customer account details from the File Storage 210 which includes the addresses, as well as the address types. The Analysis Engine 206 can then send the address, type, and/or dates to the Blockchain API Service 212. In response, the Blockchain API Service 212 provides the received information to the Blockchain Transaction Data Module 214, which then returns transactions data to the Blockchain API Service 212. Further, the Blockchain API Service 212 also provides the received type and date information to the Blockchain Transaction Data Module 214 and the pricing & market data module/reference rates module represented by Reference Rates 216, which then return transaction data and reference rate data, respectively, to the Blockchain API Service 212. Based on the received transaction and reference rate data, the Blockchain API Service 212 provides a blockchain result set to the Analysis Engine 206, which can then update the job metadata as well as insert the job result set and the customer account result set in the Database Storage 208. In addition to depicting successful flow interactions (e.g., solid arrow), the figure also depicts unsuccessful flow/error interactions (e.g., dashed arrow). As such, if for some reason a request fails, an error may be returned.

Figure 2D:
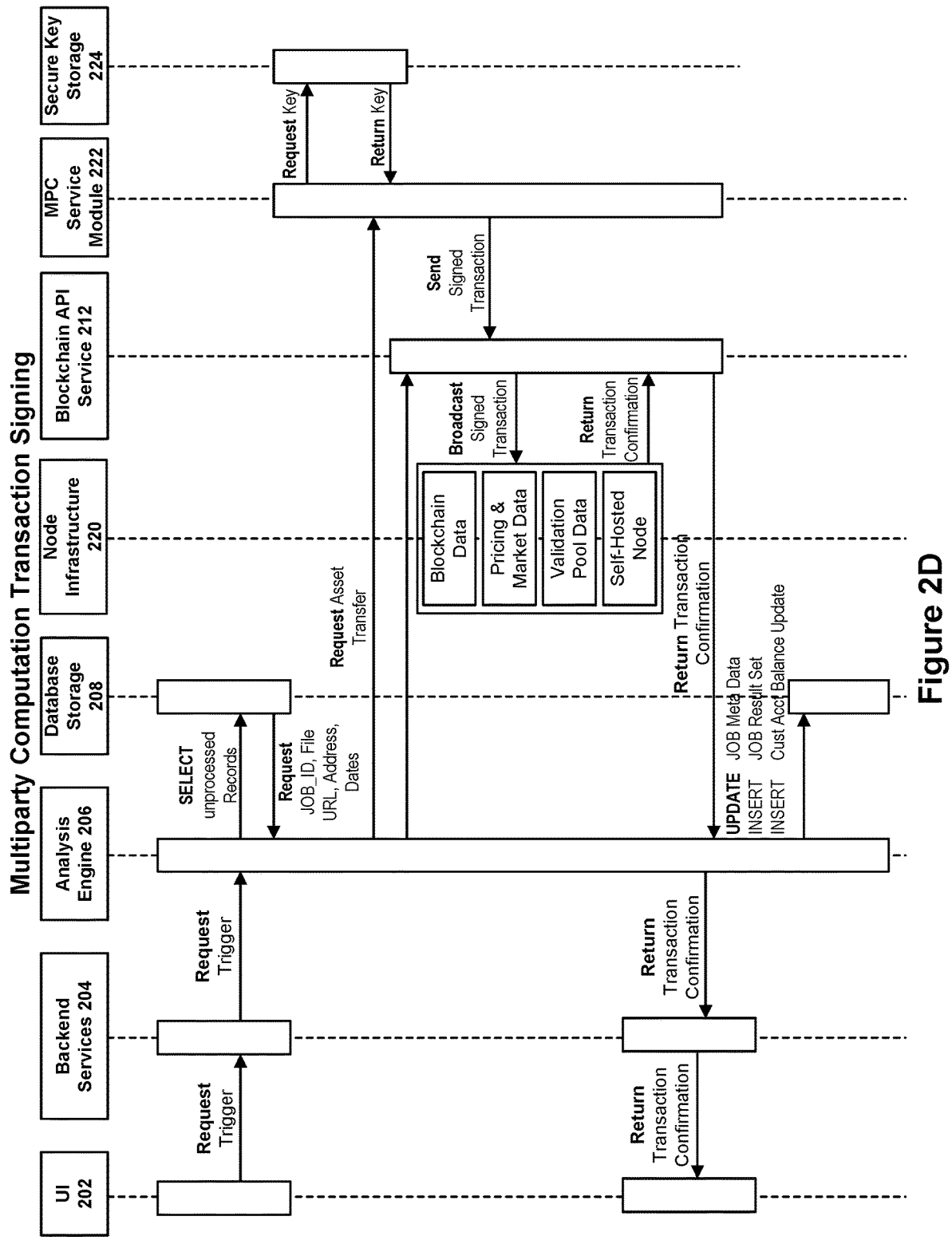
FIG. 2D depicts a multiparty computation transaction signing flow diagram using the system in FIG. 1 according to an exemplary embodiment of the invention.

FIG. 2D depicts a multiparty computation transaction signing flow diagram using the system in FIG. 1 according to an exemplary embodiment of the invention. As depicted in the figure, a user can first send a trigger to the Analysis Engine 206 via the Backend Services 204. The Analysis Engine 206 can then query unprocessed records from the Database Storage 208 in order to retrieve the job ID (JOB_ID), file URL, address, and/or dates back to the Analysis Engine 206. The Analysis Engine 206 can submit an asset transfer request to the MPC Service Module 222, which can then request and retrieve a key from the Secure Key Storage 224. After receiving the key, the MPC Service Module 222 may generate and send a signed transaction to the Blockchain API Service 212, which then broadcasts the signed transaction to Node Infrastructure 220. In response, the Node Infrastructure 220 can provide a transaction confirmation back to the Blockchain API Service 212. The Blockchain API Service 212 can then provide the transaction confirmation to the Analysis Engine 206, which can then provide the transaction confirmation to the UI 202, e.g., via the Backend Services 204. Further, as depicted in the figure, the Analysis Engine 206 can also update the job metadata as well as insert the job result set and the customer account result set in the database storage.

Figure 2E:
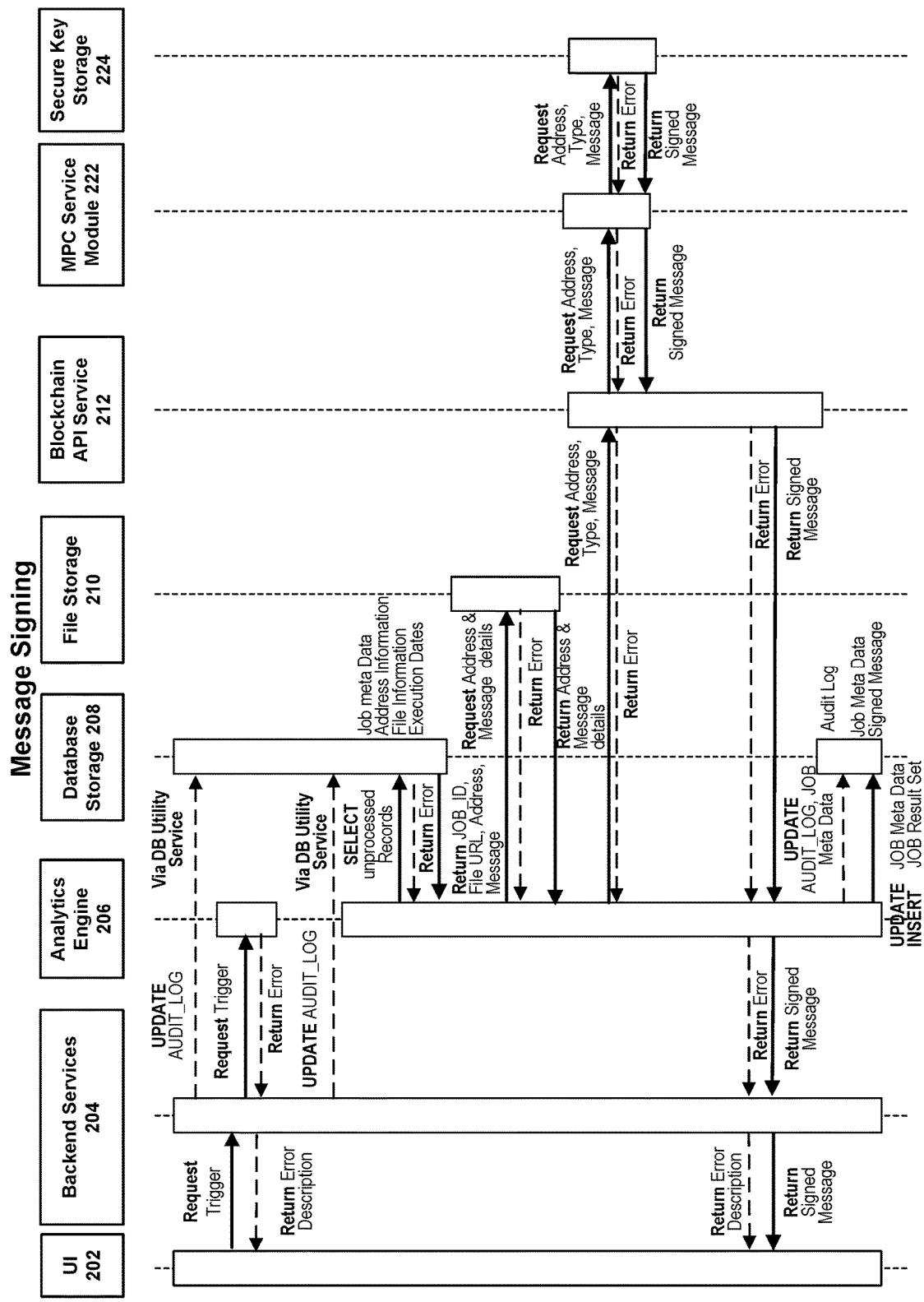
FIG. 2E depicts a message signing flow diagram using the system in FIG. 1 according to an exemplary embodiment of the invention.

FIG. 2E depicts a message signing flow diagram using the system in FIG. 1 according to an exemplary embodiment of the invention. As depicted in the figure, a user can trigger a request to the Analysis Engine 206 from the UI 202 via the Backend Services 204. The Analysis Engine 206 selects records from the Database Storage 208 in order to retrieve the job ID (JOB_ID), file URL, address, and/or message back to the Analysis Engine 206. Analysis Engine 206 requests and retrieves the address and message details from the File Storage 210. The Analysis Engine 206 can then request address, type, and/or message to the Blockchain API Service 212 which then communicates with MPC Service Module 222 and Secure Key Storage 224. Signed message may be returned from Secure Key Storage 224, via MPC Service Module 222 to Blockchain API Service 212. Further, the Blockchain API Service 212 provides the signed message to Analytics Engine 206, which can then transmit to UI 202 and update Database Storage 208, accordingly. In addition to depicting successful flow interactions (e.g., solid arrow), the figure also depicts unsuccessful flow/error interactions (e.g., dashed arrow). As such, if for some reason a request fails, an error may be returned.

Figure 2F:
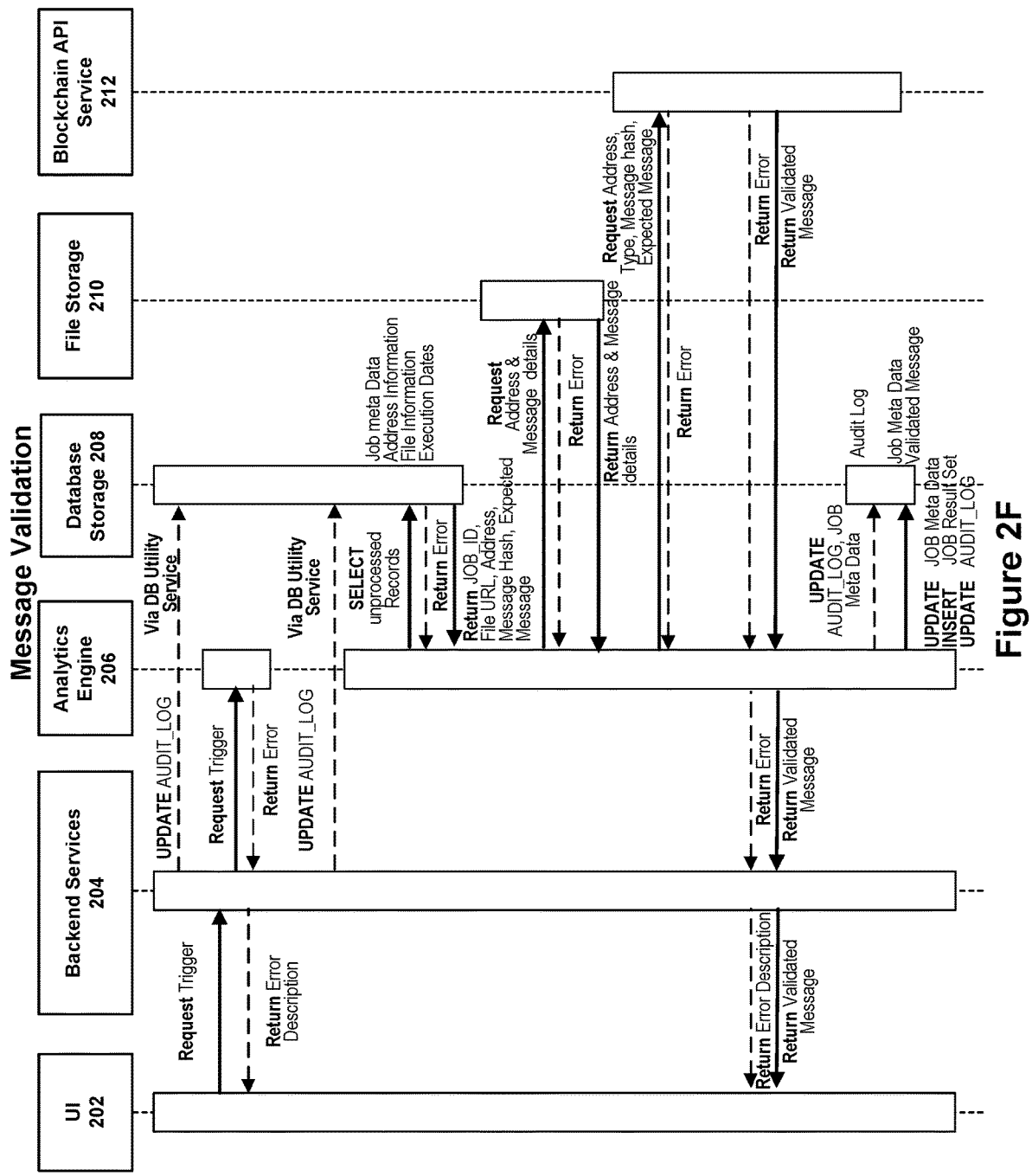
FIG. 2F depicts a message validation flow diagram using the system in FIG. 1 according to an exemplary embodiment of the invention.

FIG. 2F depicts a message validation flow diagram using the system in FIG. 1 according to an exemplary embodiment of the invention. As depicted in the figure, a user can trigger a request to the Analysis Engine 206 from the UI 202 via the Backend Services 204. The Analysis Engine 206 selects records from the Database Storage 208 in order to retrieve the job ID (JOB_ID), file URL, address, message hash and/or expected message back to the Analysis Engine 206. Analysis Engine 206 requests and retrieves the address and message details from the File Storage 210. The Analysis Engine 206 can then request the address, type, message hash and/or expected message to the Blockchain API Service 212. In response, the Blockchain API Service 212 provides the validated message to Analytics Engine 206, which can then transmit to UI 202 and update Database Storage 208, accordingly. In addition to depicting successful flow interactions (e.g., solid arrow), the figure also depicts unsuccessful flow/error interactions (e.g., dashed arrow). As such, if for some reason a request fails, an error may be returned.

According to an embodiment, as depicted with FIGS. 2A to 2F, after a request gets triggered by a user, business logic within the platform can be initiated in order to leverage data from the blockchain and internal systems, as well as conduct data analytics and, therefore, provide value-adding insights to the user.

Figure 3A:
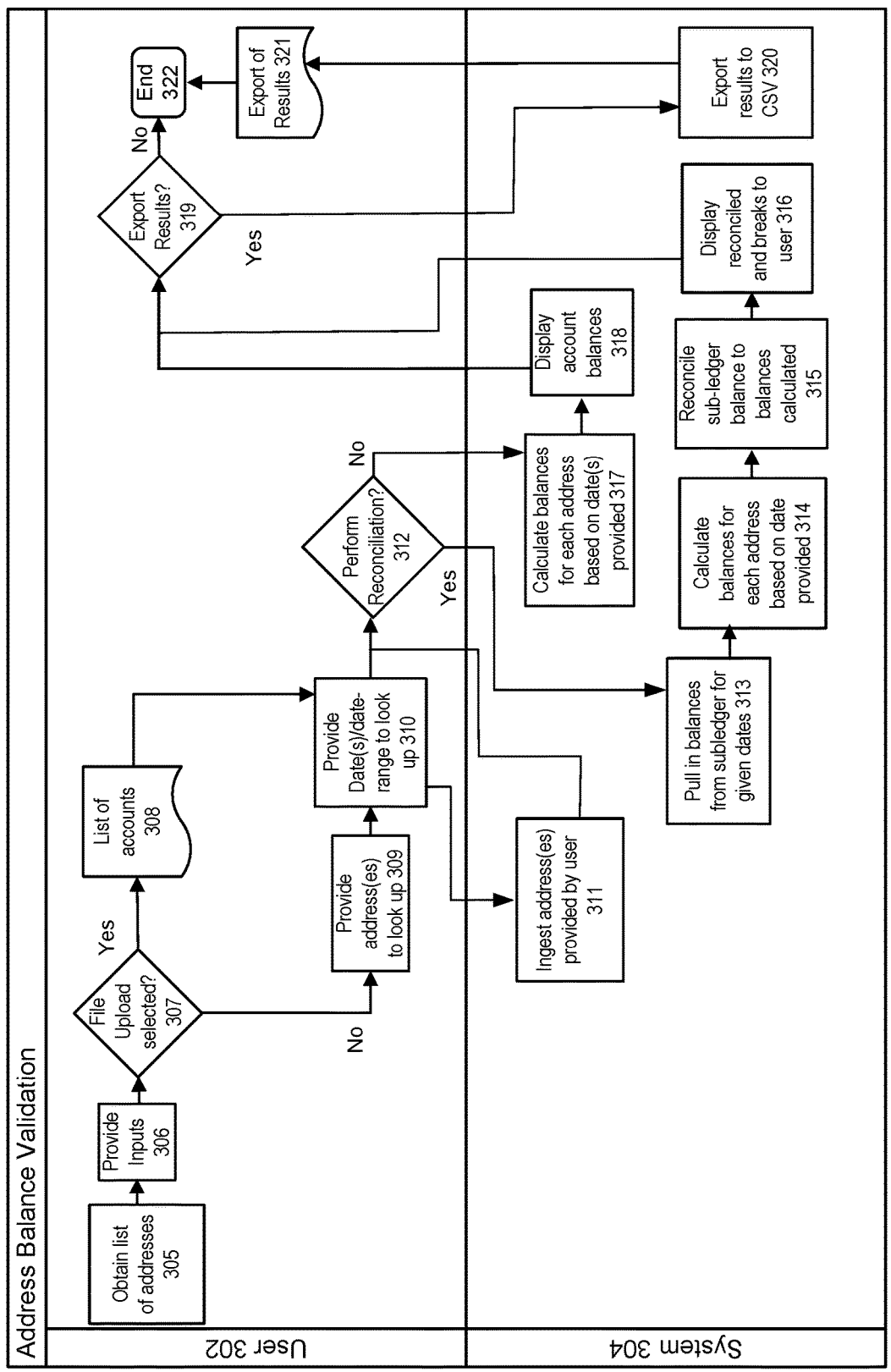
FIG. 3A depicts a user interaction for address balance validation with the system in FIG. 1 according to an exemplary embodiment of the invention.

FIG. 3A depicts a user interaction for address balance validation with the system in FIG. 1 according to an exemplary embodiment of the invention. FIG. 3A illustrates interactions between User 302 and System 304. As depicted in FIG. 3A, a user may obtain a list of addresses at 305. In this example, the user may provide a number of different inputs to the platform at 306. For example, the user can provide: (i) a short description to outline the purpose/additional information of the run, (ii) a selection of whether a reconciliation should be performed or if only balances should be calculated, (iii) a selection if one address, multiple addresses, or a file of addresses will be provided, (iv) address(es) and/or file corresponding to the address(es) and/or file selection, (v) a selection if the validation will correspond to one date, multiple dates, or a date range, and/or (vi) dates corresponding to the date selection. After the inputs are provided, it is then determined if the file upload option was selected at 307. If the answer is yes, a list of accounts can be presented to the user via the UI at 308. In this regard, the list of accounts/addresses can be provided as a comma-separated value (CSV), Excel file in a predetermined format or other format. Further, the platform can also detect the type of address for each address that was provided in the uploaded file. If the type for an address cannot be automatically detected, the platform can then indicate to user which address the type could not be detected at 309. In this regard, processing for any of the addresses cannot begin until certain issues associated with the address types have been resolved. Further, if an address is provided for a blockchain for which the platform cannot pull data, the user can be informed and required to submit a new upload without that particular address, or the platform can continue processing the data for those addresses for which it was able to pull the data. At 310, a date range may be provided. At 311, addresses provided by the user may be ingested.

Then, step 312 may determine whether a reconciliation to the sub-ledger should be performed. If the answer is yes, a user may be required to upload a structured file containing the sub-ledger records (e.g., CSV file, Excel file, etc.), from which the platform can pull balances for the given dates at 313. In this regard, if the provided sub-ledger file does not follow the required structure, the platform can provide feedback to the user indicating such and also require that a new file be uploaded. Then, according to an embodiment, the platform can calculate balances for each address based on the date(s) provided at 314. In particular, the balances can be calculated based on the value of the crypto-asset at the provided date(s). In this regard, the platform can access at least one blockchain (e.g., Bitcoin, Bitcoin Cash, Ethereum, Litecoin, etc.) via the blockchain API service. The platform can then reconcile the sub-ledger balance to the balances calculated at 315. According to an embodiment, the reconciliation can include matching the addresses provided to the accounts in the sub-ledger, determining balances in the addresses in the sub-ledger for the given dates, and then reconciling sub-ledger balances to address balances calculated for the given dates.

After reconciliation, the reconciliation results can be displayed to the user via the UI at 316. In particular, the reconciliation results can include a complete list of items that could be reconciled with dollar amounts as well as a complete list of items that could not be reconciled with dollar amounts (breaks). In this regard, the list of items that could be reconciled can include at least one or more of the following information: an address, a type of address, a begin balance (first date selected by user), an end balance (last date selected by user), a first transaction ever conducted by this address, a most recent transaction within the time period defined by the user, and/or a number of transactions completed by the address in the given time period. Further, the list of items that could not be reconciled can include at least one or more of the following information: an address, a type of address, a begin balance as per sub-ledger (first date selected by the user), a begin balance as per address (first date selected by user), an end balance as per sub-ledger (last date selected by user), end balance as per address (last date selected by user), a difference of begin balances, a difference of end balances, a first transaction ever conducted by an address as per sub-ledger and blockchain, a most recent transaction within the time period defined by the user as per sub-ledger and address, a number of transactions completed by the address in the given time period as per sub-ledger and address, and a name of the user who ran the report. Further, the reconciliation results can also highlight discrepancies between the sub-ledger and the addresses. In this regard, such output can include an address, a type of address, a date of discrepancy, a balance as per sub-ledger on a given date, a balance as per address on a given date, and/or a difference between the two.

Further, according to an embodiment, it is determined if a reconciliation to the sub-ledger should not be performed, the platform can calculate balances for each address based on date(s) provided at 317. In particular, the platform can calculate balances of each address on given dates based on the value of the crypto-asset. In this regard, the platform can access at least one blockchain (e.g., Bitcoin, Bitcoin Cash, Ethereum, Litecoin, etc.) via the blockchain API service. After which, the address balance results can be displayed to the user via the UI at 318. In particular, the address balance results can include a complete list of items for which amounts were calculated with dollar amounts as well as a complete list of items for which amounts could not be calculated with dollar amounts (or breaks). According to an embodiment, the complete list of items for which amounts were calculated with dollar amounts can include the same information as the complete list of items that could be reconciled. Similarly, the complete list of items for which amounts were not calculated with dollar amounts can include the same information as the complete list of items that could not be reconciled.

According to an embodiment, after at least one of the reconciliation results and/or address balance results are displayed to the user, it can be determined if the results should be exported at 319. If the answer is yes, the results can be converted into a structured file format (e.g., CSV, Excel, etc.) and then exported at 320, 321. Otherwise, the process ends at 322.

Further, according to an embodiment, the platform can be configured to provide the user an option to purge data immediately after running the desired information. Similarly, that platform can also be used to purge all or some past run data.

Figure 3B:
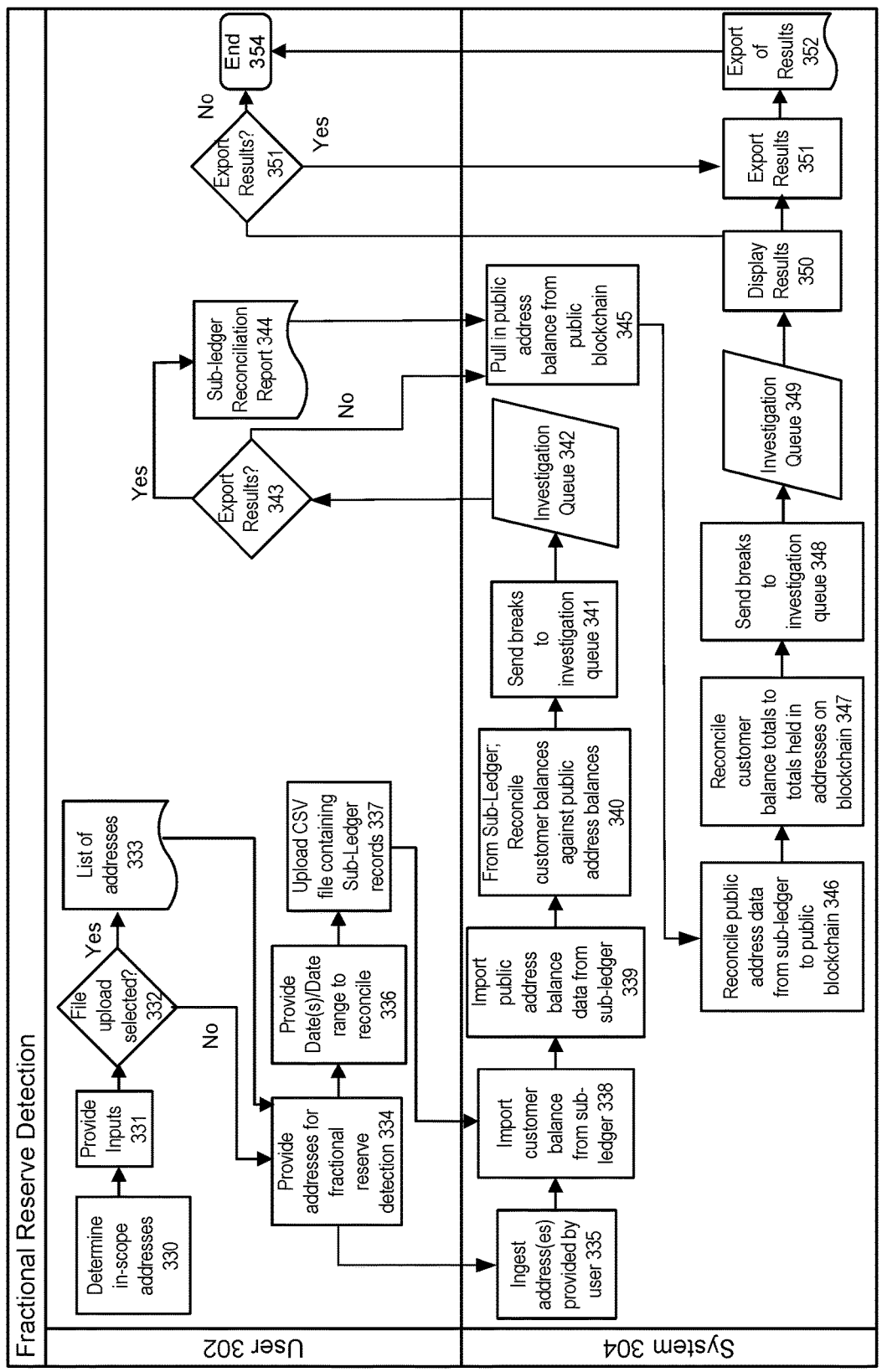
FIG. 3B depicts a user interaction for fractional reserve detection with the system in FIG. 1 according to an exemplary embodiment of the invention.

FIG. 3B depicts a user interaction for fractional reserve detection with the system in FIG. 1 according to an exemplary embodiment of the invention. FIG. 3B illustrates interactions between User 302 and System 304. As depicted in FIG. 3B, the in-scope addresses can be determined at 330. In order to do this, the user may need to provide a number of different inputs to the platform at 331. For example, the user can provide: (i) a short description to outline the purpose/additional information of the run, (ii) a selection if one address, multiple addresses, or a file of addresses will be provided, (iii) address(es) and/or file corresponding to the address(es) and/or file selection, (iv) a selection if the validation will correspond to one date, multiple dates, or a date range, and/or (v) dates corresponding to the date selection. Further, according to an embodiment, a fractional reserve detection can be run automatically based on a user-defined frequency (e.g., once per hour, once per day, etc.). Further, the user who scheduled the automatic fractional reserve runs can be notified in case of an unsuccessful run. In addition, the user can also initiate a fraction reserve detection run manually, even if an automatic schedule is defined.

After the inputs are provided, it is then determined if the file upload option for addresses was selected at 332. In this regard, if the file upload option was selected, the list of accounts/addresses can be provided as a CSV file, Excel file, or another file type in a pre-determined format at 333. Further, the platform can also detect the type of address for each address that was provided in the uploaded file. If the type for an address cannot be automatically detected, the platform can then indicate to user which address the type could not be detected. In this regard, processing for any of the addresses cannot begin until all of the issues associated with the address types have been resolved. Further, if an address is provided for a blockchain for which the platform cannot pull data, the user can be informed and required to submit a new upload without that particular address.

If the upload option was not selected, the user can then provide one or more addresses for fractional reserve detection at 334. According to an embodiment, the user can provide a single wallet address or multiple addresses to the platform via the UI. In this regard, additional addresses can be added as needed, without an upper limit. Further, if the platform cannot detect an address type automatically, the user can be provided with an option to define an address type (e.g., Bitcoin address, Ethereum address, etc.) In addition, the address can be validated based on address type. If an address is invalid, the platform can reject the address and the UI can provide feedback indicating such. Further, if the address type is invalid, the address balance validation flow will cease to execute. In this regard, the flow will execute if the address is valid and the address type is a blockchain from which the platform pulls data. As such, the user can be informed of errors and be given an opportunity to correct them.

After which, the platform can ingest and/or import the one or more addresses provided by the user at 335. Further, as depicted in the figure, the user can provide one or more dates and/or a date range to reconcile at 336. For example, the one or more dates and date ranges can be provided via a pop-up calendar. A user may then be required to upload a file containing the sub-ledger records, e.g., CSV, Excel, or other file format at 337. Then, as depicted in the figure, another sub-ledger file, which contains the customer account balance, can also be uploaded at 338. In this regard, if the provided sub-ledger file does not follow the required structure, the platform can provide feedback to the user indicating such and also request that a new file be uploaded. Further, if necessary, balances can be calculated.

After which, public address balance data can be imported from the sub-ledger at 339. In this regard, the platform can determine balances for the addresses in the sub-ledger for the given dates. The platform can then reconcile the sub-ledger against the customer accounts. Further, the platform can also reconcile the blockchain against the customer accounts at 340. Then, as depicted in the figure, the platform sends breaks to a separate investigation queue for the user to view at 341 and 342. In this regard, the breaks could be available in a separate screen to the user, in which the user is only able to view the breaks. It is then determined if the result should be exported at 343. If so, the results can be converted to a CSV or other file format, and then exported to a sub-ledger reconciliation report at 344. Otherwise, the platform can pull in public address balance data from the public blockchain at 345. In this regard, the platform can access at least one blockchain (e.g., Bitcoin, Bitcoin Cash, Ethereum, Litecoin, etc.) via the blockchain API service. The platform can then determine the balances of the address(es) from the public blockchain for the given date(s). Then, the platform can reconcile balances from the sub-ledger to the public blockchain at 346. After which, the platform can reconcile customer balance total to totals held in addresses on a blockchain at 347. In particular, the platform reconciles the customer balance totals by crypto-asset type. The breaks are then sent to a separate investigation queue for the user to view 349. The results of the fractional reserve detection can then be displayed to the user via the UI at 350. According to an embodiment, the UI is configured to display the balances of addresses in the system, as well as the breaks, and the option to export to a CSV at 351. In this regard, if the user selects to export the results, the results may convert to a CSV file (or other predefined format) at 352, 353. The process ends at 354.

In this regard, the results can include (i) a complete list of items that were reconciled both within the sub-ledger as well as with the public blockchain with dollar amounts, (ii) a complete list of all items that could not be reconciled due to mismatch in amounts in account/addresses with dollar amounts (breaks), and/or (iii) a complete list of all items that could not be reconciled because the address could not be found in one source with dollar amounts (breaks).

According to an embodiment, the complete list of reconciled items can include at least one or more of the following information: an address/customer account number, a type of address, a begin balance (first date selected by user) for customer account as well as address as per relevant source, an end balance (last date selected by user) for customer account as well as address as per relevant source, a first transaction ever conducted by this address as per sub-ledger as well as public blockchain, a most recent transaction within the time period defined by the user as per sub-ledger as well as public blockchain, and/or a number of transactions completed by the address in the given time period as per sub-ledger as well as public blockchain.

Further, the complete list of items that could not be reconciled due to mismatch can include at least one or more of the following information: an address/customer account number, a type of address, a begin balance (first date selected by user) for customer accounts as well as address(es) as per relevant source, an end balance (last date selected by user) for customer accounts as well as address(es) as per relevant source, a difference of begin balances (customer account total—sub-ledger address total & sub-ledger address—public blockchain & customer account total—blockchain address total), a difference of end balances (customer account total—sub-ledger address total & sub-ledger address—public blockchain & customer account total—blockchain address total), a first transaction ever conducted by this address as per sub-ledger and public blockchain, a most recent transaction within the time period defined by the user as per sub-ledger and public blockchain, and/or a number of transactions completed by the address in the given time period as per sub-ledger and public blockchain.

Lastly, the complete list of all items that could not be reconciled because the address could not be found in one source with dollar amounts can include at least one or more of the following information: address, type of address, where the address was found (sub-ledger or public blockchain), a begin balance (first date selected by user) for address as per relevant source, an end balance (last date selected by user) for address as per relevant source, a first transaction ever conducted by this address as per source, a most recent transaction within the time period defined by the user as per source, and/or a number of transactions completed by the address in the given time period as per source. Further, the results can also include the name of the person who ran the report.

Further, according to an embodiment, the platform can provide the user the ability to see an audit log of transactions at a granular level for all of the above use cases, changes to user access, and/or changes to the platform.

Figure 3C:
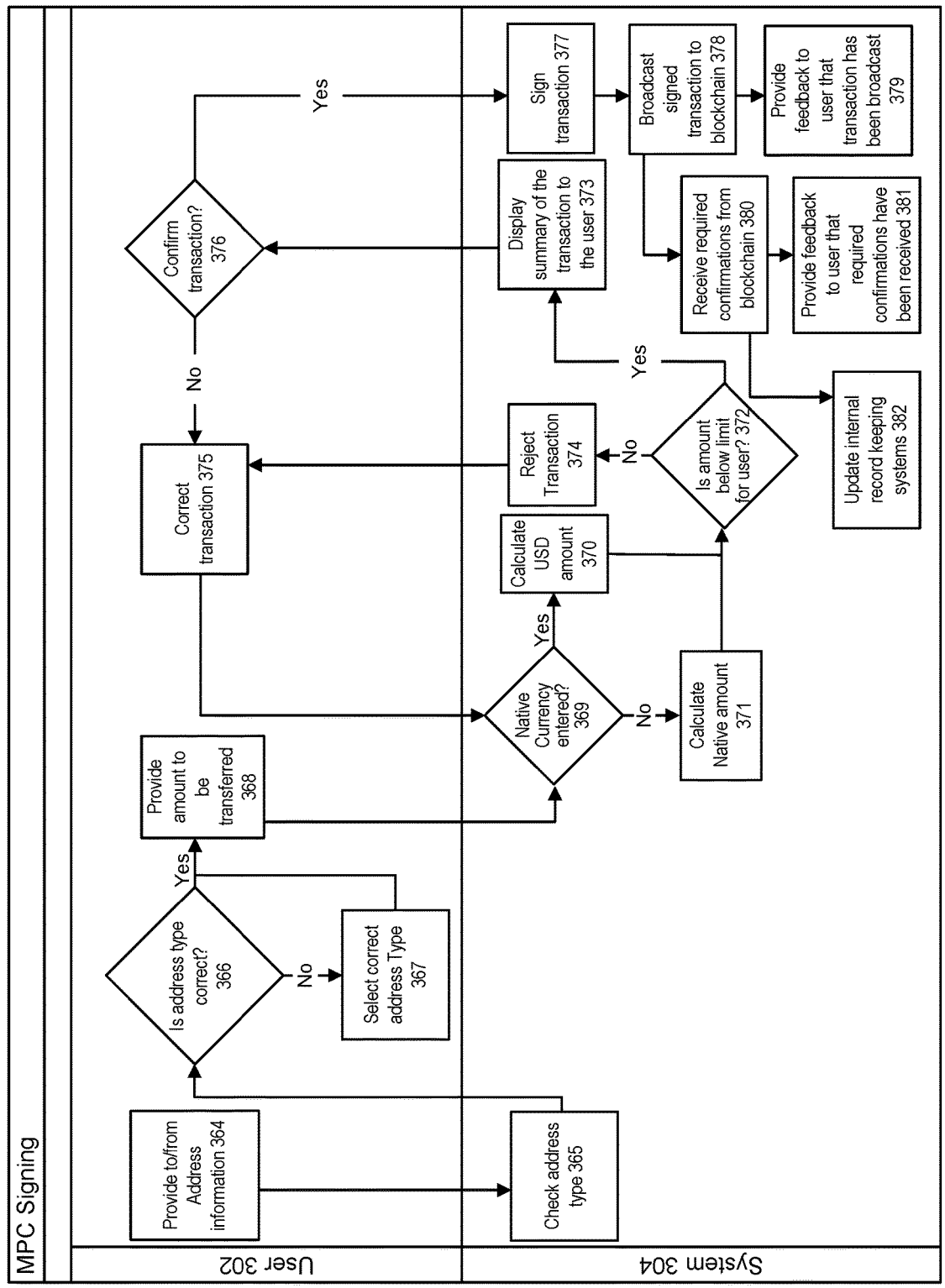
FIG. 3C depicts a user interaction for multiparty computation signing with the system in FIG. 1 according to an exemplary embodiment of the invention.

FIG. 3C depicts a user interaction for MPC signing with the system in FIG. 1 according to an exemplary embodiment of the invention. According to an embodiment, during an MPC signing: a user can request a funds transfer through a UI; the transaction can be signed using MPC; and, once the transaction is signed, the signed transaction is propagated to and recorded on the blockchain, which is when the funds can be officially transferred. For example, as depicted in the figure, a user can first provide the information required for sending funds, such as an address from which funds should be sent, an address to which funds should be sent, a currency type, and/or an amount at 364. System may check address type at 365. According to an embodiment, the user can select an address from which funds should be sent as well as an address to which funds should be sent from respective lists of pre-defined addresses at 367. Then, after the exemplary system confirms with the user that the address type is correct at 366, the user can enter the amount to be transferred at 368. According to embodiment, the amount entered can either be in a native currency or another currency, e.g., U.S. dollars. In this regard, if the amount entered is a native currency, the system can calculate the U.S. dollar amount corresponding to the native amount and then display it in the field where a U.S. dollar amount can be entered at 370. If the amount is entered in another currency, e.g., U.S. dollars, the system can calculate the native amount corresponding to the U.S. dollar amount at 371. The user can then submit the transaction for processing. After which, the system determines if the amount requested to be transferred is below a pre-defined limit for the given user at 372. If the amount is under the defined limit, the system can provide a summary screen of the information entered to the user for confirmation at 373. If the amount is over the defined limit, the system can reject the transaction at 374 and provide user the option to correct the amount at 375. According to an embodiment, assuming the amount is under the defined limit, the user can confirm the transaction for processing at 376. If the user confirms, the exemplary system can sign the transaction using MPC at 377. The system can then broadcast the signed transaction to the blockchain network at 378. In this regard, the system can also provide feedback to the user that transaction has been broadcast at 379. Further, according to an embodiment, the system can also wait for a pre-determined number of confirmations from the blockchain and, after receiving the required confirmations at 380, provide feedback to the user that the required confirmations had been received at 381. In this regard, after the user is provided feedback, the user can view certain information on the executed transactions at 382, such as: transaction status (mempool/broadcast, number of confirmations), block containing transaction, time elapsed between MPC signing and broadcast, transaction fee (e.g., gwei/gas, Satoshis per byte), blockchain submitted, transaction hash, address to which funds should be sent, address from which funds should be sent, native amount, other currency amount (e.g., U.S. dollar), memo (if appropriate), internal transactions, and/or gas used. Further, the system can also update any externals connected to the system in order to reflect the movement of assets.

Figure 3D:
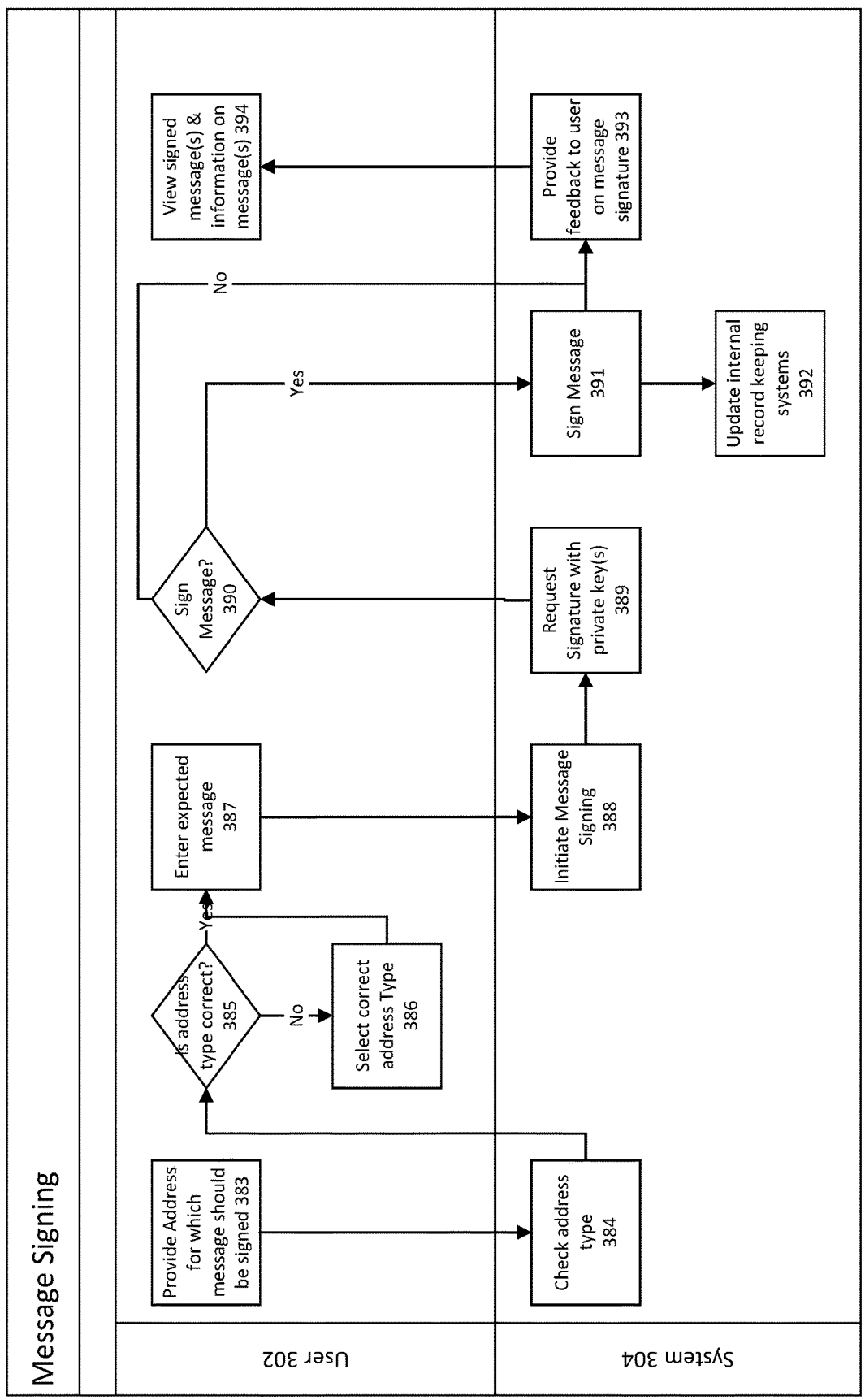
FIG. 3D depicts a user interaction for message signing with the system in FIG. 1 according to an exemplary embodiment of the invention.

FIG. 3D depicts a user interaction for message signing with the system in FIG. 1 according to an exemplary embodiment of the invention. FIG. 3D illustrates interactions between User 302 and System 304. As shown in FIG. 3D, User 302 may provide an address for which a message should be signed at 383. System 304 may then check a corresponding address type at 384. User 302 may verify that the address type is correct at 385. If not correct, User 302 may select a correct address type at 386. If correct, an expected message may be entered at 387. System 304 may then initiate message signing at 388. At 389, a signature with private key(s) may be requested. User 302 may sign the message at 390, which is then recognized or acknowledged by System 304, at 391. Internal record keeping systems may be updated at 392. If the message is not signed, feedback may be provided to the user on the message signature at 393. The user may then view the signed message(s) and information on the message(s) at 394.

Figure 3E:
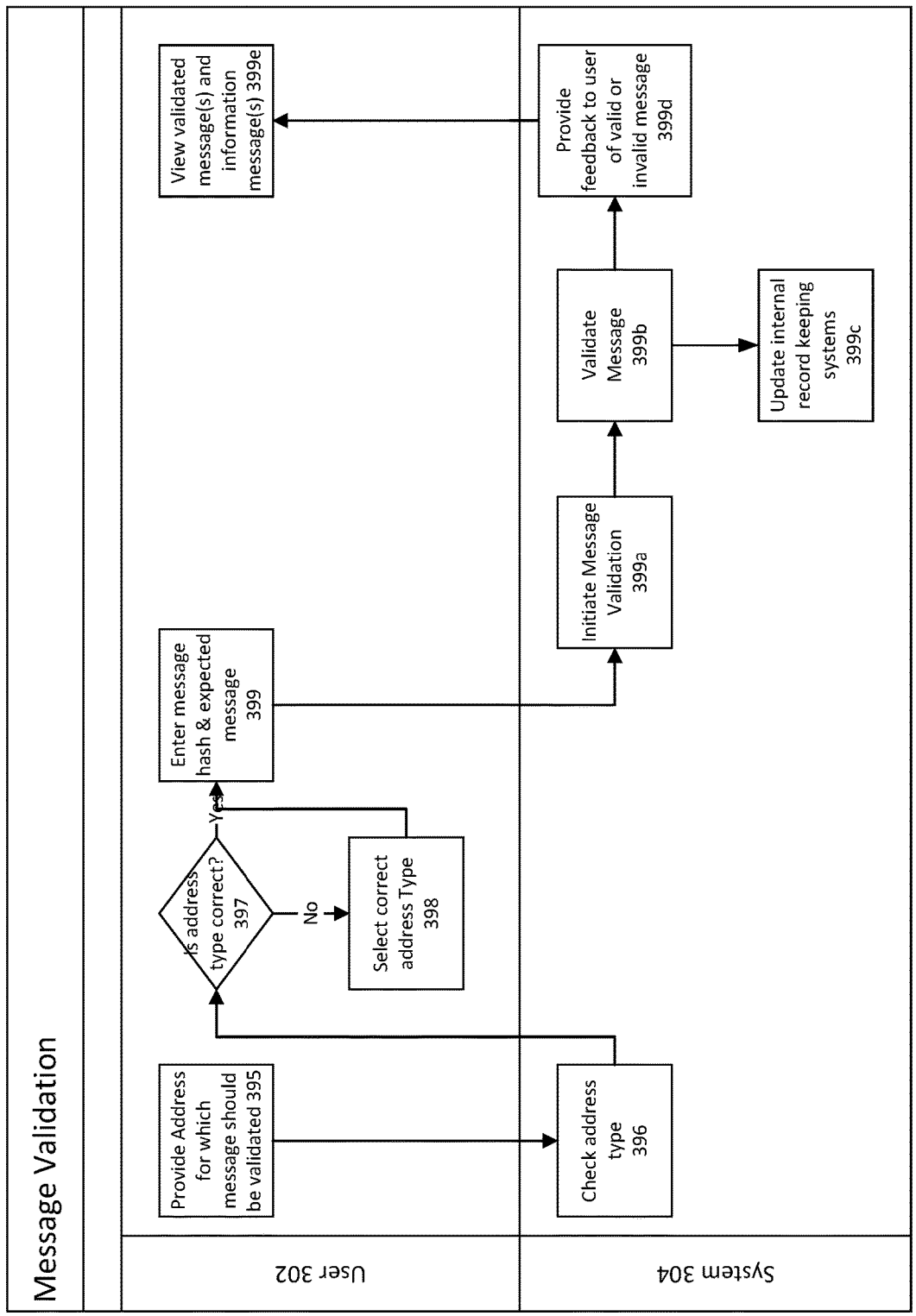
FIG. 3E depicts a user interaction for message validation with the system in FIG. 1 according to an exemplary embodiment of the invention.

FIG. 3E depicts a user interaction for message validation with the system in FIG. 1 according to an exemplary embodiment of the invention. FIG. 3E illustrates interactions between User 302 and System 304. As shown in FIG. 3E, User 302 may provide an address for which a message should be validated at 395. System 304 may then check a corresponding address type at 396. User 302 may verify that the address type is correct. If not correct, User 302 may select a correct address type at 398. If correct, User 302 may enter a message hash and an expected message at 399. System 304 may then initiate message validation at 399*a* and validate the message at 399*b*. Internal record keeping systems may be updated at 399*c*. Feedback may be provided to the user of a valid or invalid message at 399*d*. The user may then view the validated message(s) and information on the message(s) at 399*e*.

FIG. 4A depicts a user interface that can be utilized for reconciliation during the user interaction in FIG. 3A according to an exemplary embodiment of the invention. As shown in FIG. 4A, use case description may be provided at 403 and a run description at 404. The use case description may be user provided, automatically populated or generated and/or a combination thereof. As depicted in the figure, the UI 402 provides an ability for the user to: select the type of validation at 405, e.g., "Reconciliation" or "Calculate Address Balances;" upload a sub-ledger file at 406; select whether a single or multiple blockchain addresses will be processed at 407; input the blockchain address name and type at 408; select whether a single, multiple, or a range of dates for the run at 409; and input the specific date(s) for the run at 410. In this regard, "Reconciliation" is selected for the type of validation, a .CSV file is uploaded for the sub-ledger, a single blockchain address (e.g., Bitcoin blockchain) is used, and a range of dates are provided for reconciliation. As described above, the reconciliation provides multiple outputs: (i) a complete list of items that could be reconciled with dollar amounts (e.g., FIG. 4B) and (ii) a complete list of items that could not be reconciled with dollar amounts (breaks) (e.g., FIG. 4C).

FIG. 4B depicts a user interface of an address balance validation, according to an exemplary embodiment of the invention. FIG. 4B provides an exemplary illustration of items that could be reconciled, as noted by 411. FIG. 4B provides details relating to Address 413, Currency 414, Date 415, Balance (native) SL 416, Balance (USD) SL 417, Balance (native) blockchain 418, Balance (USD) blockchain 419, First Transaction 420, Last Transaction 421 and number of Transactions 422. FIG. 4B is exemplary only and other variations may be realized in accordance with the embodiments of the present invention.

FIG. 4C depicts a user interface of an address balance validation, according to an exemplary embodiment of the invention. FIG. 4C provides an exemplary illustration of items that could not be reconciled, as noted by 412. FIG. 4C provides details relating to Address 413, Currency 414, Date 415, Balance (native) SL 416, Balance (USD) SL 417, Balance (native) blockchain 418, Balance (USD) blockchain 419, First Transaction 420, Last Transaction 421 and number of Transactions 422. FIG. 4C further illustrates Difference (native) 430 and Difference (USD) 431. FIG. 4C is exemplary only and other variations may be realized in accordance with the embodiments of the present invention.

Figure 4D:
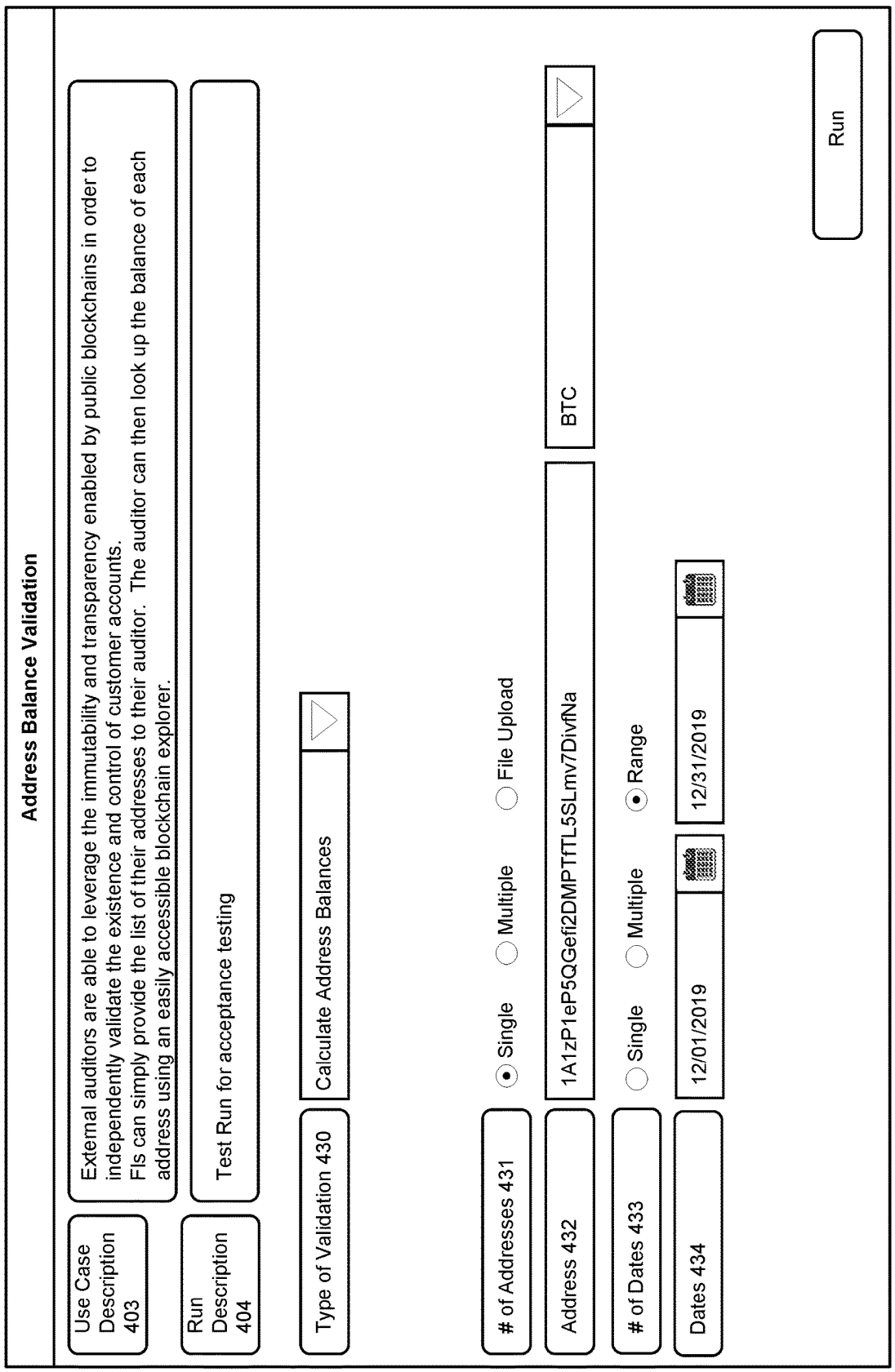
FIG. 4D depicts a user interface that can be utilized for calculating address balances during the user interaction in FIG. 3A according to an exemplary embodiment of the invention.

FIG. 4D depicts a user interface that can be utilized for calculating address balances during the user interaction in FIG. 3A according to an exemplary embodiment of the invention. As depicted in the figure, FIG. 4D is similar to FIG. 4A except that "Calculate Address Balances" is selected for the type of validation instead of "Reconciliation," at 430. As such, a sub-ledger file does not need to be uploaded. In this regard, a single blockchain address is used (e.g., Bitcoin blockchain) at 431, 432 and a range of dates are provided for the address balance calculation. Further, exemplary calculated address balances are provided in FIG. 4E.

FIG. 4E depicts a user interface of an address balance validation, according to an exemplary embodiment of the invention. FIG. 4E provides an exemplary illustration of calculated address balances. FIG. 4E provides details relating to Address 440, Currency 441, Date 442, Balance (native) 443, Balance (USD) 444, First Transaction 445, Last Transaction 446 and number of Transactions 447. FIG. 4E is exemplary only and other variations may be realized in accordance with the embodiments of the present invention.

Figure 4F:
FIG. 4F depicts a user interface that can be utilized for fractional reserve detection during the user interaction in FIG. 3B according to an exemplary embodiment of the invention.

FIG. 4F depicts a user interface that can be utilized for fractional reserve detection during the user interaction in FIG. 3B according to an exemplary embodiment of the invention. As shown in FIG. 4F, use case description may be provided at 450 and a run description at 451. The use case description may be user provided, automatically populated or generated and/or a combination thereof. As depicted in the figure, the UI provides an ability for the user to: upload a sub-ledger file at 452; upload a customer account balance file at 453; select whether a single or multiple blockchain addresses will be processed at 454; input the blockchain address name and type at 455; select whether a single, multiple, or a range of dates for the run at 456; and input the specific date(s) for the run at 457. In this regard, a .CSV file is uploaded for the sub-ledger, another .CSV file is uploaded for the customer account(s), multiple blockchain addresses (e.g., Bitcoin blockchain, Ethereum blockchain, etc.) are used, and a single date is provided for the fractional reserve detection.

In this regard, as described above, the fractional reserve detection can result in a number of outputs: (i) a complete list of addresses that were reconciled (e.g., FIG. 4G), (ii) a complete list of addresses that could not be reconciled due to mismatch in SL and blockchain amounts (e.g., FIG. 4H), (iii) a complete list of addresses that could not be reconciled because data for the address could not be found in one source (SL or blockchain)(e.g., FIG. 4I), (iv) a complete list of customer accounts that were reconciled (e.g., FIG. 4J), and/or (v) a complete list of customer accounts that could not be reconciled (e.g., FIG. 4K). The construction of merkle tree proofs may be generated using privacy protecting techniques to obfuscate unrelated information while providing cryptographic guarantees that customer accounts are included.

FIG. 4G depicts a user interface of a fractional reserve detection, according to an exemplary embodiment of the invention. FIG. 4G provides an exemplary illustration of addresses that were reconciled as noted by 460. FIG. 4G provides details relating to Address Type 470, Currency 471, Date 472, Balance (native) SL 473, Balance (USD) SL 474, Balance (native) blockchain 475, Balance (USD) blockchain 476, First Transaction 477, Last Transaction 478 and number of Transactions 479. FIG. 4G is exemplary only and other variations may be realized in accordance with the embodiments of the present invention.

FIG. 4H depicts a user interface of a fractional reserve detection, according to an exemplary embodiment of the invention. FIG. 4H provides an exemplary illustration of addresses that could not be reconciled due to mismatch in amounts between the SL and the blockchain as noted by 461. FIG. 4H provides details relating to Address Type 470, Currency 471, Date 472, Balance (native) SL Address 473, Balance (USD) SL Address 474, Balance (native) blockchain Address 475, Balance (USD) blockchain Address 476, First Transaction 477, Last Transaction 478 and number of Transactions 479. FIG. 4H also includes Difference (native) 480 and Difference (USD) 481. FIG. 4H is exemplary only and other variations may be realized in accordance with the embodiments of the present invention.

FIG. 4I depicts a user interface of a fractional reserve detection, according to an exemplary embodiment of the invention. FIG. 4I provides an exemplary illustration of addresses that could not be reconciled because a balance could not be found for the address in one source as noted by 462. FIG. 4I provides details relating to Address Type 470, Currency 471, Date 472, Balance (native) SL Address 473, Balance (USD) SL Address 474, Balance (native) blockchain Address 475, Balance (USD) blockchain Address 476, First Transaction 477, Last Transaction 478 and number of Transactions 479. FIG. 4I is exemplary only and other variations may be realized in accordance with the embodiments of the present invention.

FIG. 4J depicts a user interface of a fractional reserve detection, according to an exemplary embodiment of the invention. FIG. 4J provides an exemplary illustration of customer reconciliation data as noted by 463. More specifically, FIG. 4J shows days for which the total assets held for customers in customer accounts reconciled with totals held per sub-ledger and blockchain. FIG. 4J provides details relating to Address Type 482, Total held for Customers (native) 483, Total held for Customers (UDS) 484, Balance in Subledger address (native) 485, Balance in Subledger address (USD) 486, Balance on Chain (native) 487 and Balance on Chain (USD) 488. FIG. 4J is exemplary only and other variations may be realized in accordance with the embodiments of the present invention.

FIG. 4K depicts a user interface of a fractional reserve detection, according to an exemplary embodiment of the invention. FIG. 4K provides an exemplary illustration of customer account amounts that could not be reconciled between the SL and blockchain as noted by 464. FIG. 4K provides details relating to Address Type 482, Total held for Customers (native) 483, Total held for Customers (UDS) 484, Balance in Subledger address (native) 485, Balance in Subledger address (USD) 486, Balance on Chain (native) 487 and Balance on Chain (USD) 488. FIG. 4K also provides Difference to Subledger (native) 489, Difference to Subledger (USD) 490, Difference to on chain assets (native 491 and Difference to on chain assets (USD) 492. FIG. 4K is exemplary only and other variations may be realized in accordance with the embodiments of the present invention.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. For example, although the various embodiments described herein refer to blockchains and blockchain-related technology, the invention is not limited to such embodiments but, rather, can be used with any distributed ledger technology.

The system described above can be implemented with servers and other computing devices in various configurations. The various servers and computing devices may use software to execute programs to execute the methods described above. Various embodiments of the invention also relate to the software or computer readable medium containing program instructions for executing the above described methods.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Communications networks connect the various computing devices described above and may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a GPS link, a cellular digital packet data (CDPD) link, a Research in Motion, Limited (RIM) duplex paging type device, a Bluetooth radio link, or an IEEE 802.11-based radio frequency link as well as mobile networks including 5G. Communications networks may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript and others. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), on premise deployments and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system implementing an analytics computing platform for distributed ledger data integrated alongside non-distributed ledger data from systems operating in a server environment, the system comprising:
    an electronic input configured to receive input data from a user interface that is integrated with back-end services system;
    a database system that stores and manages job metadata, address information, file information and execution dates as well as data from the server environment;
    a secure key storage that cryptographically stores key data; and
    an analytics engine that comprises a computer processor, coupled to the electronic input and the database system, wherein the computer processor is further configured to perform the steps of:
       selecting one or more records from the database system to retrieve a process identifier;
       receiving, from the database system, one or more address details and one or more address types corresponding to the process identifier;

communicating the one or more address details and the one or more address types to a blockchain API service wherein the blockchain API service receives transaction data and reference data; and receiving a blockchain result set generated by the blockchain API service, wherein the blockchain result set comprises the transactional data for the one or more address details and the reference data corresponding to the one or more address types;

wherein the analytics engine analyzes data from one or more different distributed ledger systems and one or more non-distributed ledger systems to provide insights into interactions between the one or more different distributed ledger systems and the one or more non-distributed ledger systems.

2. The system of claim 1, wherein the database system further comprises a file storage.

3. The system of claim 1, wherein the transaction data is received by the blockchain API service from a data provider.

4. The system of claim 1, wherein the reference data is received by the blockchain API service from a reference rates module.

5. The system of claim 1, wherein the computer processor is further configured to: update job metadata corresponding to the process identifier.

6. The system of claim 1, wherein the computer processor is further configured to perform the step of: updating an audit log via the database system.

7. The system of claim 1, wherein the computer processor is further configured to perform the step of: inserting data relating to the blockchain result set in the database system.

8. The system of claim 1, wherein the analytics engine further receives sub-ledger or ledger details from the database system corresponding to the process identifier.

9. The system of claim 1, wherein the analytics engine further receives customer account details corresponding to the process identifier.

10. The system of claim 1, wherein the server environment represents a mainframe environment or a microservices environment.

11. A method for implementing an analytics computing platform for distributed ledger data integrated alongside non-distributed ledger data from systems operating in a server environment, the method comprising the steps of:

selecting, by an analytics engine, one or more records from a database system to retrieve a process identifier, wherein the analytics engine comprises a computer processor and is coupled to the database system that stores and manages job metadata, address information, file information and execution dates as well as data from the server environment;

receiving, from the database system, one or more address details and one or more address types corresponding to the process identifier;

communicating the one or more address details and the one or more address types to a blockchain API service wherein the blockchain API service receives transaction data and reference data; and receiving a blockchain result set generated by the blockchain API service, wherein the blockchain result set comprises the transactional data for the one or more address details and the reference data corresponding to the one or more address types;

wherein the analytics engine analyzes data from one or more different distributed ledger systems and one or more non-distributed ledger systems to provide insights into interactions between the one or more different distributed ledger systems and the one or more non-distributed ledger systems.

12. The method of claim 11, wherein the database system further comprises a file storage.

13. The method of claim 11, wherein the transaction data is received by the blockchain API service from a data provider.

14. The method of claim 11, wherein the reference data is received by the blockchain API service from a reference rates module.

15. The method of claim 11, wherein the computer processor is further configured to: update job metadata corresponding to the process identifier.

16. The method of claim 11, further comprising the step of: updating an audit log via the database system.

17. The method of claim 11, further comprising the step of: inserting data relating to the blockchain result set in the database system.

18. The method of claim 11, wherein the analytics engine further receives sub-ledger or ledger details from the database system corresponding to the process identifier.

19. The method of claim 11, wherein the analytics engine further receives customer account details corresponding to the process identifier.

20. The method of claim 11, wherein the server environment represents a mainframe environment or a microservices environment.

* * * * *